United States Patent
Yatabe

(10) Patent No.: US 12,500,983 B2
(45) Date of Patent: Dec. 16, 2025

(54) LIGHT SCANNING APPARATUS AND IMAGE FORMING APPARATUS

(71) Applicant: CANON KABUSHIKI KAISHA, Tokyo (JP)

(72) Inventor: Toru Yatabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 17/214,205

(22) Filed: Mar. 26, 2021

(65) Prior Publication Data
US 2021/0314462 A1  Oct. 7, 2021

(30) Foreign Application Priority Data

Apr. 2, 2020 (JP) .................................. 2020-066473
Mar. 24, 2021 (JP) .................................. 2021-049648

(51) Int. Cl.
H04N 1/00 (2006.01)
G02B 26/12 (2006.01)
G02B 27/00 (2006.01)

(52) U.S. Cl.
CPC ....... H04N 1/00018 (2013.01); G02B 26/123 (2013.01); G02B 26/125 (2013.01); G02B 27/0031 (2013.01)

(58) Field of Classification Search
CPC .............. H04N 1/00018; G02B 26/123; G02B 26/125; G02B 27/0031
See application file for complete search history.

(56) References Cited

U.S. PATENT DOCUMENTS 5,995,131 A * 11/1999 Fujibayashi ....... G02B 13/0005
  359/662
6,097,421 A *  8/2000 Takeshita ............. G02B 26/125
  359/662

(Continued)

FOREIGN PATENT DOCUMENTS

JP  2004157205 A   6/2004
JP  2020003719 A * 1/2020

OTHER PUBLICATIONS

MIL-HDBK-141 "Military Standardization Handbook Optical Design" Oct. 1962, p. 8-15 (Year: 1962).*
Wikipedia "Aspheric lens" (Year: 2020).*

*Primary Examiner* — George G. King
(74) *Attorney, Agent, or Firm* — Canon U.S.A., Inc. IP Division

(57) ABSTRACT

An apparatus including: a deflector deflecting a light flux from a light source to scan a surface in a main scanning direction; and an imaging optical system including first and second optical elements, and guiding the light flux deflected by the deflector to the surface. When sagittal shapes of an incident surface and an exit surface of each of the first and second optical elements are represented by the following equations:

$$x = \frac{z^2/r'}{1 + (1-(z/r')^2)^{1/2}} + \sum_{n=1}^{8}\sum_{m=0}^{16} M_{mn} y^m z^n$$

$$r' = r\left(1 + \sum_{i=1}^{16} E_i y^i\right)$$

in at least one of incident surface or exit surface of first optical element and each of incident surface and exit surface (Continued)

of second optical element, at least one of values of $M_{mn}$ is not equal to 0 provided that m is not equal to 0, and incident surface and exit surface of second optical element have $M_{01}$ of the same sign.

17 Claims, 18 Drawing Sheets

(56) References Cited

U.S. PATENT DOCUMENTS

| | | | | |
|---|---|---|---|---|
| 2003/0020801 A1* | 1/2003 | Yamaguchi | ........... | G02B 26/125 |
| | | | | 347/259 |
| 2003/0183747 A1* | 10/2003 | Takakubo | ............ | G02B 26/123 |
| | | | | 250/208.1 |
| 2004/0090658 A1* | 5/2004 | Takakubo | ........... | G02B 27/0031 |
| | | | | 359/204.1 |
| 2004/0109212 A1* | 6/2004 | Shimomura | .......... | G02B 26/125 |
| | | | | 359/207.1 |
| 2004/0227806 A1* | 11/2004 | Takakubo | ............ | G02B 26/123 |
| | | | | 347/241 |
| 2005/0219673 A1* | 10/2005 | Fujino | ................... | G02B 26/127 |
| | | | | 347/259 |
| 2006/0126147 A1* | 6/2006 | Takakubo | ............ | G02B 26/123 |
| | | | | 348/E3.009 |
| 2013/0176374 A1* | 7/2013 | Kurokawa | ............ | G02B 26/101 |
| | | | | 359/204.1 |
| 2015/0369971 A1* | 12/2015 | Kurokawa | ............ | G02B 26/123 |
| | | | | 347/261 |
| 2017/0134603 A1* | 5/2017 | Kurokawa | ........ | G03G 15/04036 |

* cited by examiner

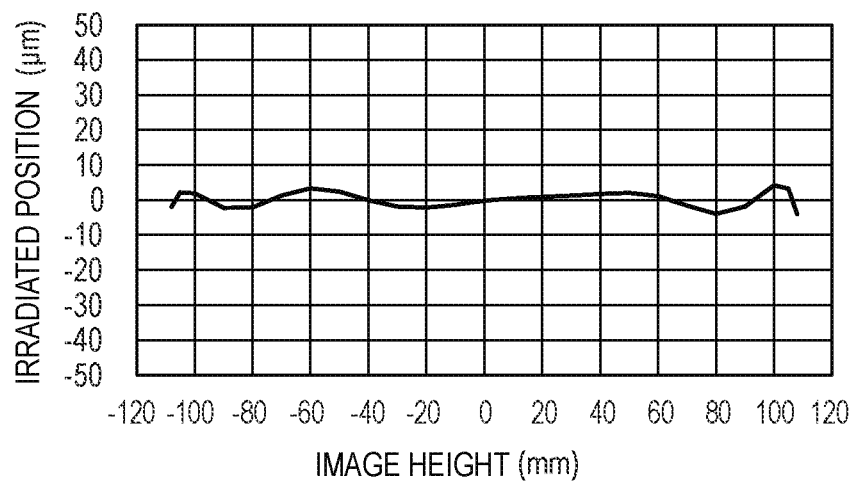
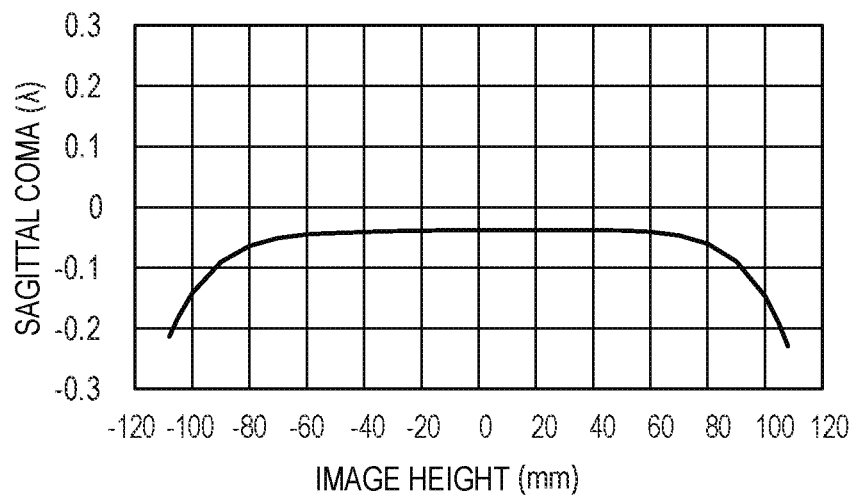
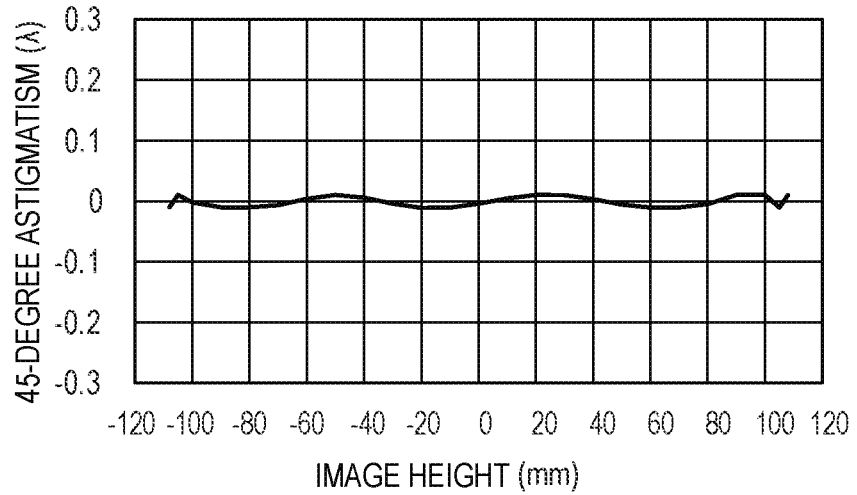

LIGHT SCANNING APPARATUS AND IMAGE FORMING APPARATUS

BACKGROUND OF THE DISCLOSURE

Field of the Disclosure

The aspect of the embodiments relates to an optical scanning apparatus, and is more particularly for an image forming apparatus, for example, a laser beam printer (LBP), a digital copying machine, or a multifunction printer (MFP).

Description of the Related Art

Hitherto, it has been known that, in a light scanning apparatus, reflection light reflected by an optical surface of an imaging optical element may enter a scanned surface as unnecessary light (ghost) to cause reduction in image quality, or the reflection light may return to a light source via a deflector as unnecessary light (return light) to cause unstable output of the light source.

In Japanese Patent Application Laid-Open No. 2004-157205, there is disclosed a light scanning apparatus using an imaging optical element having an optical surface (sagittal tilt surface) whose sagittal line is tilted with respect to an optical axis in order to suppress occurrence of such unnecessary light.

In Japanese Patent Application Laid-Open No. 2004-157205, in a configuration (sub-scanning obliquely-incident system) in which light fluxes are caused to obliquely enter the deflector within a sub-scanning cross section, an aspherical surface is provided to correct scanning-line curvature to be caused by the sagittal tilt surface.

However, in a configuration in which light fluxes are caused to perpendicularly enter the deflector within the sub-scanning cross section, it is difficult to sufficiently correct reduction in optical performance caused by the sagittal tilt surface by providing one aspherical surface as in Japanese Patent Application Laid-Open No. 2004-157205.

Further, the definition expression for the aspherical surface in the sub-scanning cross section described in Japanese Patent Application Laid-Open No. 2004-157205 includes a third-order aspherical coefficient, and hence sensitivity with respect to operation performance in response to light beam vibrations on the imaging optical element is disadvantageously increased.

SUMMARY OF THE DISCLOSURE

An apparatus including: a first deflector configured to deflect a first light flux from a first light source to scan a first surface in a main scanning direction; and a first imaging optical system which includes a first optical element and a second optical element, and is configured to guide the deflected first light flux to the first surface, wherein, regarding an incident surface and an exit surface of each of the first optical element and the second optical element, when an intersection with an optical axis is set as an origin, an axis parallel to the optical axis is set as an x-axis, an axis perpendicular to the optical axis within a main scanning cross section is set as a y-axis, an axis perpendicular to the optical axis within a sub-scanning cross section is set as a z-axis, an aspherical coefficient is represented by $M_{mn}$, a curvature radius within the sub-scanning cross section including the optical axis is represented by r, a variation coefficient is represented by $E_i$, and shapes within the sub-scanning cross section of the incident surface and the exit surface of each of the first optical element and the second optical element are represented by the following equations:

$$x = \frac{z^2/r'}{1+(1-(z/r')^2)^{1/2}} + \sum_{n=1}^{8}\sum_{m=0}^{16} M_{mn} y^m z^n$$

$$r' = r\left(1 + \sum_{i=1}^{16} E_i y^i\right)$$

in at least one of the incident surface or the exit surface of the first optical element and each of the incident surface and the exit surface of the second optical element, at least one of values of $M_{mn}$ is not equal to 0 provided that m is not equal to 0, and wherein the incident surface and the exit surface of the second optical element have $M_{01}$ of the same sign.

Further features of the disclosure will become apparent from the following description of exemplary embodiments with reference to the attached drawings.

BRIEF DESCRIPTION OF THE DRAWINGS

FIG. 5A is a graph for showing an image height dependence of optical performance in the related-art light scanning apparatus.

FIG. 5B is a graph for showing an image height dependence of optical performance in the related-art light scanning apparatus.

FIG. 5C is a graph for showing an image height dependence of optical performance in the related-art light scanning apparatus.

DESCRIPTION OF THE EMBODIMENTS

Figure 1A:
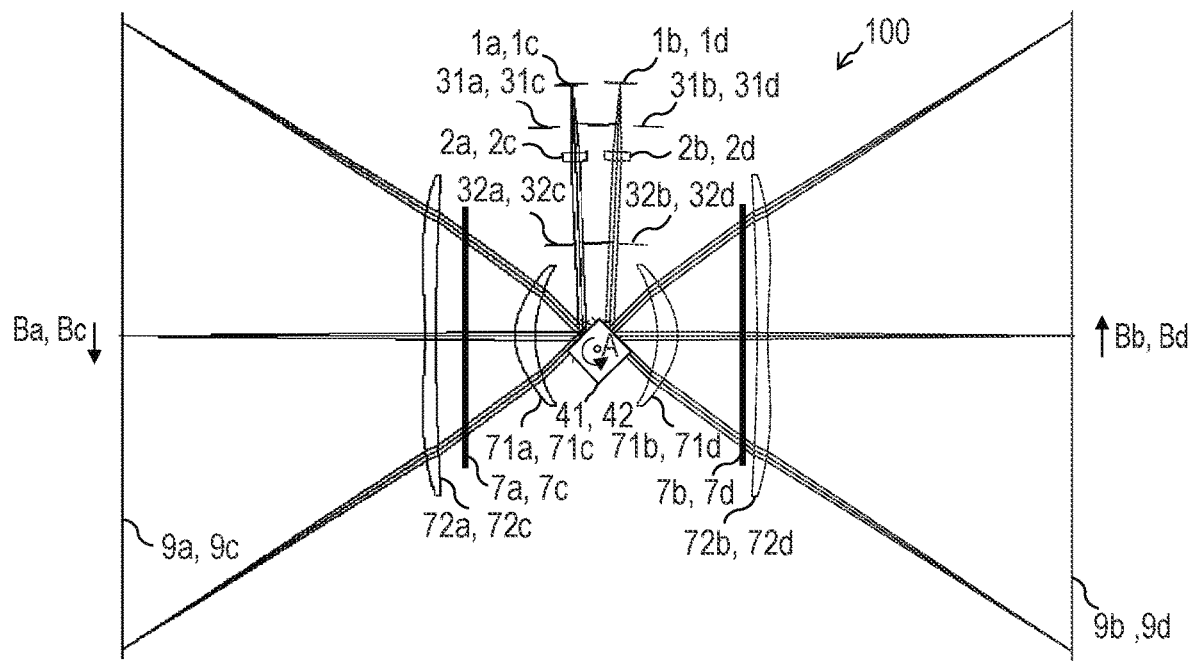
FIG. 1A is a developed view within a main scanning cross section of a light scanning apparatus according to a first embodiment.

A light scanning apparatus according to an aspect of the embodiments is described in detail below with reference to the accompanying drawings. Some of the drawings referred to below may be drawn in scales different from the actual scale for easier understanding of the aspect of the embodiments.

Hitherto, a light scanning apparatus has been widely used in, for example, a laser beam printer (LBP) and a digital copying machine.

In the light scanning apparatus, a light flux optically modulated in accordance with an image signal is emitted from a light source such as a laser, and is periodically deflected by a deflector formed of, for example, a rotary polygon mirror (polygon mirror).

Then, the deflected light flux is condensed as a spot onto a photosensitive surface (scanned surface) of a photosensitive member (image bearing member) by an imaging optical system having an fθ characteristic. In this manner, light scans the photosensitive surface to record an image.

Further, in the image forming apparatus such as the laser beam printer, the digital copying machine, or a multifunction printer, downsizing and increase in image quality have been demanded.

Further, when the image quality of the image forming apparatus is to be increased, it has been known that reflection light from an optical surface of an imaging optical element provided in the imaging optical system of the light scanning apparatus may be one cause of deterioration in image quality.

Specifically, the reflection light from the optical surface of the imaging optical element may re-enter the deflector and may return to the light source thereafter. This may cause return light which causes unstable output of the light source.

Further, the reflection light from the optical surface of the imaging optical element provided in the imaging optical system may re-enter the deflector and may re-enter the imaging optical system thereafter. This may cause ghost arriving at the scanned surface.

Still further, the reflection light from the optical surface of the imaging optical element provided in the imaging optical system may enter an optical path of another imaging optical system arranged on an opposing side. This may cause ghost arriving at even the scanned surface on the opposing side.

Yet further, optical elements are arranged close to each other when downsizing is to be achieved. In this case, such return light and ghost are more liable to be caused.

In view of the above, in order to reduce such return light and ghost, there has been known a configuration in which the optical surface of the imaging optical element is tilted so as to suppress the entry of the reflection light from the imaging optical element into the optical path.

However, when the optical surface of the imaging optical element is tilted as described above, optical performance may be reduced in accordance therewith. In this case, a configuration for correcting the reduced optical performance is also required.

The light scanning apparatus according to this embodiment is aimed to ensure sufficient optical performance while suppressing occurrence of return light and ghost. Thus, it is aimed to obtain a light scanning apparatus with which increase in image quality can be achieved, and to obtain an image forming apparatus using the light scanning apparatus.

First Embodiment

Figure 1B:
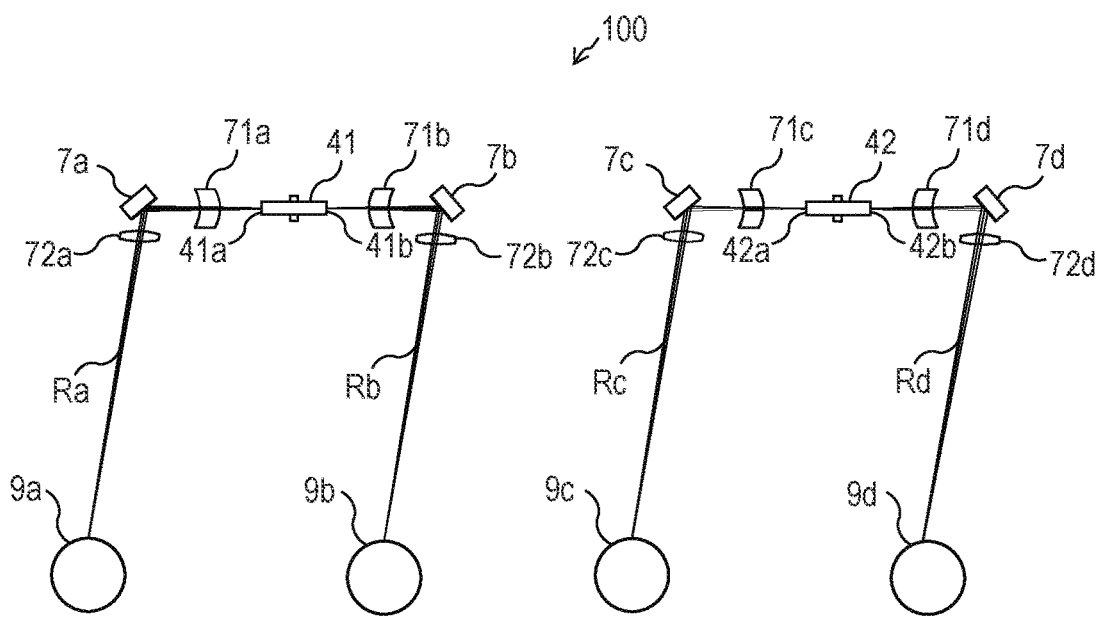
FIG. 1B is a sub-scanning cross-sectional view of the light scanning apparatus according to the first embodiment.

FIG. 1A and FIG. 1B are a developed view within a main scanning cross section of a light scanning apparatus 100 according to a first embodiment and a sub-scanning cross-sectional view of imaging optical systems, respectively.

In the following description, a main scanning direction refers to a direction perpendicular to a rotational axis of a deflector (rotary polygon mirror) and an optical axis of an imaging optical system (direction in which a scanned surface is optically scanned by the deflector). A sub-scanning direction refers to a direction parallel to the rotational axis of the deflector.

Further, a main scanning cross section refers to a cross section perpendicular to the sub-scanning direction (cross section parallel to the main scanning direction and the optical axis of the imaging optical system). A sub-scanning cross section refers to a cross section perpendicular to the main scanning direction (cross section parallel to the sub-scanning direction and the optical axis of the imaging optical system).

As illustrated in FIG. 1A and FIG. 1B, the light scanning apparatus 100 according to the first embodiment includes light sources 1a, 1b, 1c, and 1d (first, second, third, and fourth light sources), anamorphic lenses 2a, 2b, 2c, and 2d, and sub-scanning stops 31a, 31b, 31c, and 31d.

The light scanning apparatus 100 according to the first embodiment further includes main scanning stops 32a, 32b, 32c, and 32d, deflectors 41 and 42, and first imaging optical elements 71a, 71b, 71c, and 71d.

The light scanning apparatus 100 according to the first embodiment further includes second imaging optical elements 72a, 72b, 72c, and 72d, and folding mirrors 7a, 7b, 7c, and 7d.

The light sources 1a to 1d are each, for example, a semiconductor laser including light emitting points.

The anamorphic lenses 2a to 2d each have different positive powers (refractive powers) within the main scanning cross section and the sub-scanning cross section. Further, the anamorphic lenses 2a to 2d are each configured to convert incident light fluxes into substantially parallel light fluxes within the main scanning cross section, and condense the light fluxes in the sub-scanning cross section. In this case, the substantially parallel light fluxes include weakly divergent light fluxes, weakly convergent light fluxes, and parallel light fluxes.

The sub-scanning stops 31a to 31d are each configured to restrict the shape of the incident light fluxes in the sub-scanning direction (light flux width or light flux diameter in the sub-scanning direction).

The main scanning stops 32a to 32d are each configured to restrict the shape of the incident light fluxes in the main scanning direction (light flux width or light flux diameter in the main scanning direction).

Accordingly, the incident light fluxes are formed into desired shapes by the sub-scanning stops 31a to 31d and the main scanning stops 32a to 32d.

The deflectors 41 and 42 are each a rotary polygon mirror (polygon mirror) serving as a deflecting unit, and are each configured to rotate at a certain speed in an arrow A direction of FIG. 1A. In the light scanning apparatus 100 according to the first embodiment, the deflectors 41 and 42 are arranged in line in the sub-scanning direction so that the deflectors 41 and 42 are independently rotatable.

The first imaging optical elements 71a to 71d and the second imaging optical elements 72a to 72d are, for example, imaging lenses configured to guide (condense) the incident light fluxes to scanned surfaces 9a to 9d, respectively.

The folding mirrors 7a to 7d are configured to fold (reflect) the incident light fluxes toward the scanned surfaces 9a to 9d, respectively.

In the light scanning apparatus 100 according to the first embodiment, the sub-scanning stop 31a, the anamorphic lens 2a, and the main scanning stop 32a form a first incident optical system 75a.

Further, the sub-scanning stop 31b, the anamorphic lens 2b, and the main scanning stop 32b form a second incident optical system 75b.

Further, the sub-scanning stop 31c, the anamorphic lens 2c, and the main scanning stop 32c form a third incident optical system 75c.

Further, the sub-scanning stop 31d, the anamorphic lens 2d, and the main scanning stop 32d form a fourth incident optical system 75d.

Further, in the light scanning apparatus 100 according to the first embodiment, the first imaging optical element 71a and the second imaging optical element 72a form a first imaging optical system 85a, and the first imaging optical element 71b and the second imaging optical element 72b form a second imaging optical system 85b.

Further, the first imaging optical element 71c and the second imaging optical element 72c form a third imaging optical system 85c, and the first imaging optical element 71d and the second imaging optical element 72d form a fourth imaging optical system 85d.

As illustrated in FIG. 1A and FIG. 1B, light fluxes Ra, Rb, Rc, and Rd emitted from the respective light sources 1a to 1d are restricted in shape in the sub-scanning direction by the sub-scanning stops 31a to 31d, respectively.

Then, the light fluxes Ra to Rd that have passed through the respective sub-scanning stops 31a to 31d are converted into substantially parallel light fluxes within the main scanning cross section and condensed in the sub-scanning cross section by the anamorphic lenses 2a to 2d, respectively.

Next, the light fluxes Ra to Rd that have passed through the respective anamorphic lenses 2a to 2d are restricted in shape in the main scanning direction by the main scanning stops 32a to 32d, respectively.

Then, the light fluxes Ra and Rb that have passed through the respective main scanning stops 32a and 32b perpendicularly enter a first deflecting surface 41a and a second deflecting surface 41b of the deflector 41 (first deflector), respectively.

Further, the light fluxes Rc and Rd that have passed through the respective main scanning stops 32c and 32d perpendicularly enter a first deflecting surface 42a and a second deflecting surface 42b of the deflector 42 (second deflector), respectively.

That is, the first and fourth incident optical systems 75a and 75d are each arranged so that its optical axis is parallel to the main scanning cross section perpendicular to the rotational axes of the deflectors 41 and 42.

Then, the light fluxes Ra to Rd emitted from the respective light sources 1a to 1d enter the deflecting surfaces (deflecting and reflecting surfaces) 41a, 41b, 42a, and 42b of the deflectors 41 and 42 within the main scanning cross section via the first and fourth incident optical systems 75a and 75d, respectively.

In this manner, the light fluxes Ra to Rd are each condensed within the sub-scanning cross section, and are imaged as long line images in the main scanning direction in the vicinity of the deflecting surfaces 41a, 41b, 42a, and 42b, respectively.

Then, the light flux Ra reflected and deflected by the first deflecting surface 41a of the deflector 41 is condensed (imaged as a light spot) on the scanned surface 9a (first scanned surface) via the first imaging optical element 71a, the folding mirror 7a, and the second imaging optical element 72a.

Then, the light flux Rb reflected and deflected by the second deflecting surface 41b of the deflector 41 is condensed (imaged as a light spot) on the scanned surface 9b (second scanned surface) via the first imaging optical element 71b, the folding mirror 7b, and the second imaging optical element 72b.

Then, the light flux Rc reflected and deflected by the first deflecting surface 42a of the deflector 42 is condensed (imaged as a light spot) on the scanned surface 9c (third scanned surface) via the first imaging optical element 71c, the folding mirror 7c, and the second imaging optical element 72c.

Then, the light flux Rd reflected and deflected by the second deflecting surface 42b of the deflector 42 is condensed (imaged as a light spot) on the scanned surface 9d (fourth scanned surface) via the first imaging optical element 71d, the folding mirror 7d, and the second imaging optical element 72d.

Then, the deflectors 41 and 42 are rotated in the arrow A direction of FIG. 1A, and thus the light spots scan the scanned surfaces 9a to 9d in directions of arrows Ba, Bb, Bc, and Bd, respectively, to thereby form electrostatic latent images.

Examples of the scanned surfaces 9a to 9d include photosensitive drum surfaces.

In place of the anamorphic lenses 2a to 2d used in the light scanning apparatus 100 according to the first embodiment, collimator lenses for converting the incident light fluxes into substantially parallel light fluxes and cylindrical lenses for condensing the light fluxes in the sub-scanning cross section may be used.

Next, various characteristics of the first to fourth incident optical systems 75a to 75d and the first to fourth imaging optical systems 85a to 85d of the light scanning apparatus 100 according to the first embodiment are shown in Table 1 below.

In Table 1. E±x means ×10$^{\pm x}$. Further, coefficients are all 0 unless otherwise noted.

TABLE 1

| Configurations and arrangements of incident optical system 75 and imaging optical system 85 | | | | | Lens surface data of imaging optical system 85 | | | |
|---|---|---|---|---|---|---|---|---|
| | | | | | First imaging optical element 71 | | Second imaging optical element 72 | |
| | | | | | Incident surface | Exit surface | Incident surface | Exit surface |
| Usage wavelength | λ (nm) | 792 | Meridional | R | −32.952 | −21.329 | −800.000 | 144.020 |
| Number of light emitting points | n | 4 | line | ky | 0.943 | −0.926 | 0.000 | −69.458 |
| Laser cover glass, thickness | d1 (mm) | 0.250 | | B1 | 0.000E+00 | 0.000E+00 | 0.000E+00 | 0.000E+00 |
| Laser cover glass, refractive index | n1 | 1.510 | | B2 | 0.000E+00 | 0.000E+00 | 0.000E+00 | 0.000E+00 |
| From light emitting point of light source 1 to sub-scanning stop 31 | d2 (mm) | 14.400 | | B3 | 0.000E+00 | 0.000E+00 | 0.000E+00 | −5.953E−08 |
| | | | | B4 | 1.031E−05 | 2.457E−06 | 0.000E+00 | −2.415E−06 |
| From sub-scanning stop 31 to incident surface of anamorphic lens 2 | d3 (mm) | 8.801 | | B5 | 0.000E+00 | 0.000E+00 | 0.000E+00 | −1.438E−10 |
| | | | | B6 | 5.173E−08 | 1.224E−08 | 0.000E+00 | 1.183E−09 |
| Anamorphic lens 2, thickness | d4 (mm) | 3.000 | | B7 | 0.000E+00 | 0.000E+00 | 0.000E+00 | 1.823E−13 |
| Anamorphic lens 2, refractive index | n2 | 1.528 | | B8 | −1.090E−10 | 3.148E−11 | 0.000E+00 | −4.554E−13 |
| Incident surface of anamorphic lens 2, curvature radius within main scanning cross section | R1m (mm) | ∞ | | B9 | 0.000E+00 | 0.000E+00 | 0.000E+00 | −8.685E−17 |
| | | | | B10 | 9.182E−14 | −7.942E−14 | 0.000E+00 | 1.084E−16 |
| | | | | B11 | 0.000E+00 | 0.000E+00 | 0.000E+00 | 1.538E−20 |
| Incident surface of anamorphic lens 2, curvature radius within sub-scanning cross section | R1s (mm) | ∞ | | B12 | 0.000E+00 | 0.000E+00 | 0.000E+00 | −1.149E−20 |
| | | | Sagittal line | r | 13.000 | 13.000 | 16.894 | −320.127 |
| | | | | E1 | 0.000E+00 | 0.000E+00 | −4.842E−03 | 8.622E−02 |
| Exit surface of anamorphic lens 2, curvature radius within main scanning cross section | R2m (mm) | −13.152 | | E2 | 0.000E+00 | −6.358E−04 | 5.569E−04 | 4.785E−03 |
| | | | | E3 | 0.000E+00 | 0.000E+00 | −3.947E−06 | 1.456E−04 |
| | | | | E4 | 0.000E+00 | 4.580E−06 | −1.023E−07 | 1.378E−06 |
| Exit surface of anamorphic lens 2, curvature radius within sub-scanning cross section | R2s (mm) | −9.254 | | E5 | 0.000E+00 | 0.000E+00 | 5.384E−09 | −7.318E−08 |
| | | | | E6 | 0.000E+00 | −8.735E−09 | −1.057E−10 | −2.906E−09 |
| | | | | E7 | 0.000E+00 | 0.000E+00 | −1.923E−13 | −4.267E−11 |
| From exit surface of anamorphic lens 2 to main scanning stop 32 | d5 (mm) | 27.499 | | E8 | 0.000E+00 | −2.814E−12 | 5.336E−14 | −3.470E−13 |
| | | | | E9 | 0.000E+00 | 0.000E+00 | −1.238E−15 | 8.913E−16 |
| From main scanning stop 32 to deflection reference point | d6 (mm) | 30.700 | | E10 | 0.000E+00 | 2.797E−14 | 1.343E−17 | 3.877E−16 |
| | | | | E11 | 0.000E+00 | 0.000E+00 | 2.885E−19 | 1.051E−17 |

TABLE 1-continued

| | | | | | | | |
|---|---|---|---|---|---|---|---|
| From deflection reference point to incident surface of first imaging optical element 71 | d7 (mm) | 16.000 | E12 | 0.000E+00 | 0.000E+00 | −7.428E−21 | 7.829E−20 |
| | | | m0_1 | 0.000E+00 | 0.000E+00 | 1.222E−01 | 1.244E−01 |
| | | | m1_1 | 0.000E+00 | 0.000E+00 | 4.661E−05 | 8.506E−05 |
| First imaging optical element 71, thickness | d8 (mm) | 6.700 | m2_1 | 0.000E+00 | 1.041E−04 | 4.675E−05 | 1.532E−05 |
| | | | m3_1 | 0.000E+00 | 0.000E+00 | −8.712E−08 | −3.439E−08 |
| First imaging optical element 71, refractive index | n3 | 1.528 | m4_1 | 0.000E+00 | −1.543E−07 | −7.620E−08 | −1.417E−08 |
| | | | m5_1 | 0.000E+00 | 0.000E+00 | −9.626E−12 | −8.129E−11 |
| From exit surface of first imaging optical element 71 to folding mirror 7 | d9 (mm) | 26.373 | m6_1 | 0.000E+00 | −1.918E−09 | 2.892E−11 | −6.270E−12 |
| | | | m7_1 | 0.000E+00 | 0.000E+00 | 2.889E−14 | 4.491E−14 |
| From folding mirror 7 to incident surface of second imaging optical element 72 | d10 (mm) | 8.890 | m8_1 | 0.000E+00 | 4.449E−12 | −4.935E−16 | 5.761E−15 |
| Second imaging optical element 72, thickness | d11 (mm) | 3.500 | | | | | |
| Second imaging optical element 72, refractive index | n4 | 1.528 | | | | | |
| From deflection reference point to scanned surface 9 | (mm) | 153.848 | | | | | |
| Incident optical system 75, incident angle in main scanning direction | α (degree) | 87.500 | | | | | |
| Incident optical system 75, incident angle in sub-scanning direction | β (degree) | 0.000 | | | | | |
| fθ coefficient | K (mm/rad) | 134.000 | | | | | |
| Effective scanning angle | θ (degree) | ±46.18 | | | | | |
| Effective scanning width | W (mm) | ±108 | | | | | |
| Deflector 41, 42, number of surfaces | Surface | 4 | | | | | |
| Deflector 41, 42, circumradius | Rpol (mm) | 10 | | | | | |
| Deflector 41, 42, center position | PX (mm) | −5.747 | | | | | |
| Deflector 41, 42, center position | PY (mm) | −4.222 | | | | | |
| Aperature stop diameter | Rectangle (mm) | 2.80 × 1.40 | | | | | |

In this case, an intersection (lens surface vertex) between each lens surface and an optical axis is set as an origin. An axis parallel to the optical axis is set as an x-axis, an axis perpendicular to the optical axis within the main scanning cross section is set as a y-axis, and an axis perpendicular to the optical axis within the sub-scanning cross section is set as a z-axis.

At this time, an aspherical shape (meridional shape) within the main scanning cross section of each of the incident surfaces and the exit surfaces of the first imaging optical elements 71a to 71d and the second imaging optical elements 72a to 72d is expressed by the following expression (1).

$$x = \frac{y^2/R}{1 + (1 - (1+k_y)(y/R)^2)^{1/2}} + \sum_{i=1}^{16} B_i y^i \quad (1)$$

In this case, R represents a curvature radius, $k_y$ represents an eccentricity, and $B_i$ (i=1, 2, 3, ..., 16) represents an aspherical coefficient.

Further, an aspherical shape (sagittal shape) within the sub-scanning cross section of each of the incident surfaces and the exit surfaces of the first imaging optical elements 71a to 71d and the second imaging optical elements 72a to 72d is expressed by the following expression (2).

$$x = \frac{z^2/r'}{1 + (1 - (z/r')^2)^{1/2}} + \sum_{n=1}^{8}\sum_{m=0}^{16} M_{mn} y^m z^n \quad (2)$$

In this case, $M_{mn}$ (m=0 to 16 and n=1 to 8) represents an aspherical coefficient.

Further, a curvature radius r' within the sub-scanning cross section is successively changed as expressed in the following expression (3) in accordance with the y-coordinate of the lens surface.

$$r' = r\left(1 + \sum_{i=1}^{16} E_i y^i\right) \quad (3)$$

In this case, r represents a curvature radius within the sub-scanning cross section including the optical axis, and $E_i$ (i=1 to 16) represents a variation coefficient.

Further, the following coefficient in the expression (2):

$$\sum_{m=0}^{16} M_{mn} y^m$$

can be referred to as an aspherical coefficient in an n-th order sagittal line.

In particular, the aspherical coefficient in the first-order sagittal line is represented as follows.

$$\sum_{m=0}^{16} M_{m1} y^m$$

This aspherical coefficient can be referred to as a tilt angle (sagittal tilt angle) within the sub-scanning cross section.

Further, y=0 is satisfied on the optical axis, and hence the tilt angle within the sub-scanning cross section including the optical axis is represented by $M_{01}$.

As shown in Table 1, in the light scanning apparatus 100 according to the first embodiment, the exit surfaces of the first imaging optical elements 71a to 71d, the incident surfaces of the second imaging optical elements 72a to 72d, and the exit surfaces of the second imaging optical elements 72a to 72d each have a first-order aspherical surface with respect to z.

That is, each optical surface is a sagittal tilt changing surface in which the sagittal tilt angle changes in accordance with the position y in the main scanning direction.

In other words, in the exit surfaces of the first imaging optical elements 71a to 71d, the incident surfaces of the second imaging optical elements 72a to 72d, and the exit surfaces of the second imaging optical elements 72a to 72d, at least one of values of $M_{mn}$ is not equal to 0 provided that m is not equal to 0.

Further, as shown in Table 1, in the incident surfaces and the exit surfaces of the second imaging optical elements 72a to 72d, $M_{01}$ is not equal to 0.

That is, the incident surfaces and the exit surfaces of the second imaging optical elements 72a to 72d have sagittal tilt angles even on the optical axis.

Accordingly, in the incident surfaces and the exit surfaces of the second imaging optical elements 72a to 72d, the origin in the shape definition and the surface vertex (most protruding point in the optical axis direction) do not match each other.

Further, in the light scanning apparatus 100 according to the first embodiment, the first imaging optical elements 71a to 71d have the same shape, and the first imaging optical elements 71b and 71d are arranged so as to be inverted in the sub-scanning direction with respect to the first imaging optical elements 71a and 71c, respectively.

Similarly, the second imaging optical elements 72a to 72d have the same shape, and the second imaging optical elements 72b and 72d are arranged so as to be inverted in the sub-scanning direction with respect to the second imaging optical elements 72a and 72c.

Further, in the light scanning apparatus 100 according to the first embodiment, the first imaging optical elements 71a to 71d and the second imaging optical elements 72a to 72d are formed of plastic molded lenses.

Next, effects in the light scanning apparatus 100 according to the first embodiment are described.

As illustrated in FIG. 1A and FIG. 1B, in the light scanning apparatus 100 according to the first embodiment, the first and third imaging optical systems 85a and 85c and the second and fourth imaging optical systems 85b and 85d are arranged on both sides across the deflectors 41 and 42.

Further, the light fluxes Ra to Rd are deflected by the different deflecting surfaces 41a, 41b, 42a, and 42b of the deflectors 41 and 42, to thereby scan the plurality of scanned surfaces 9a to 9d.

In such a both-side scanning system, reflection light reflected by the optical surface of the imaging optical element provided in one imaging optical system may enter another imaging optical system.

As a result, the reflection light reflected by the optical surface of the imaging optical element provided in the one imaging optical system may reach a scanned surface which is not supposed to be scanned, that is, a scanned surface on another side, to thereby cause ghost.

Further, the reflection light reflected by the optical surface of the imaging optical element may re-enter the deflectors 41 and 42, and may return to the light source thereafter. This may cause return light which causes unstable output of the light source.

In addition, the reflection light reflected by the optical surface of the imaging optical element may re-enter the deflectors 41 and 42 and may be re-deflected thereafter. This may cause ghost arriving at the scanned surface via the imaging optical element.

Accordingly, in such a both-side scanning system used in the light scanning apparatus 100 according to the first embodiment, the above-mentioned ghost and return light may cause image defects.

In view of the above, in the light scanning apparatus 100 according to the first embodiment, the second imaging optical elements 72a to 72d which are especially related to the issue of the reflection light from the optical surface are designed so that each optical surface (that is, incident surface and exit surface) has a sagittal tilt angle on the optical axis.

Figure 2A:
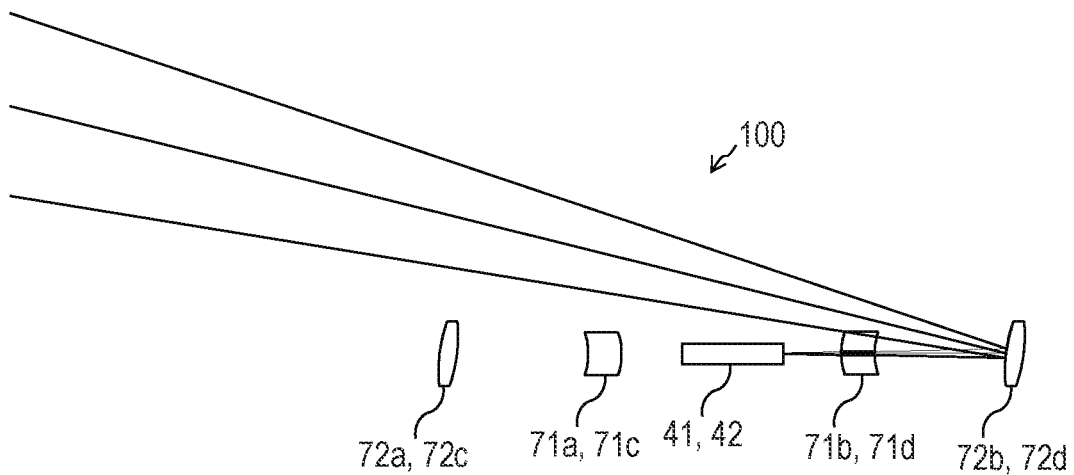
FIG. 2A is a view for illustrating a state of reflection by imaging optical elements of the light scanning apparatus according to the first embodiment.
Figure 2B:
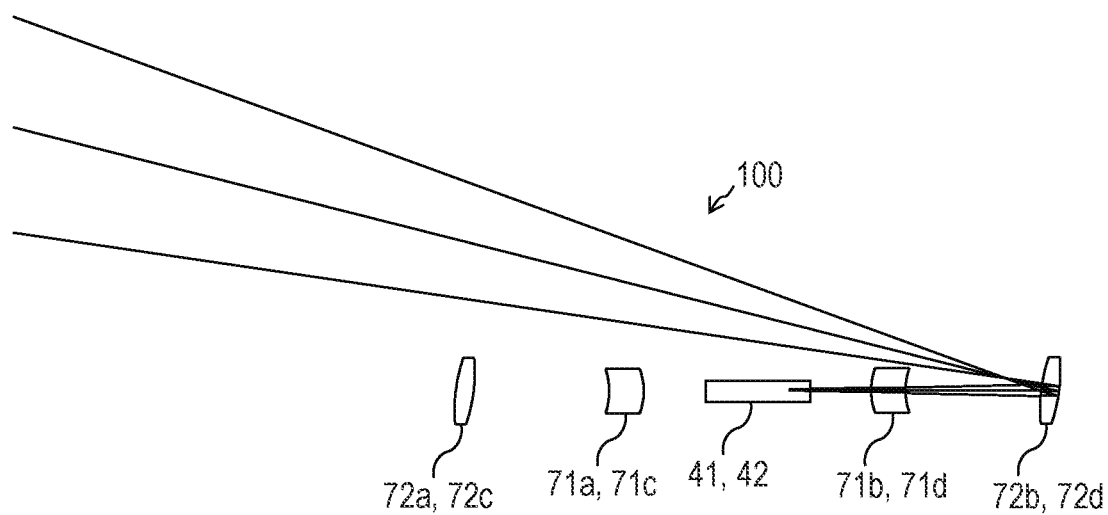
FIG. 2B is a view for illustrating a state of reflection by the imaging optical elements of the light scanning apparatus according to the first embodiment.

In this manner, as illustrated in each of FIG. 2A and FIG. 2B, the reflection light reflected by the incident surfaces and the exit surfaces of the second imaging optical elements 72a to 72d pass above or below the deflectors 41 and 42 in the sub-scanning direction.

Accordingly, in the light scanning apparatus 100 according to the first embodiment, the reflection light reflected by the incident surfaces and the exit surfaces of the second imaging optical elements 72a to 72d can be prevented from entering the deflectors 41 and 42 or the imaging optical system arranged on another side across the deflectors 41 and 42.

Figure 3A:
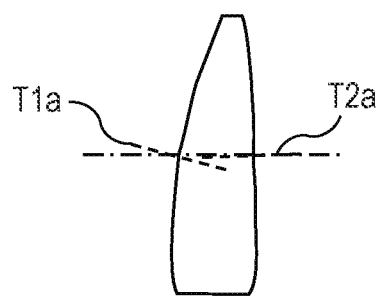
FIG. 3A is a sub-scanning cross-sectional view of an imaging optical element in a related-art light scanning apparatus.

FIG. 3A is a sub-scanning cross-sectional view of a second imaging optical element in a related-art light scanning apparatus using an obliquely-incident system.

Figure 3B:
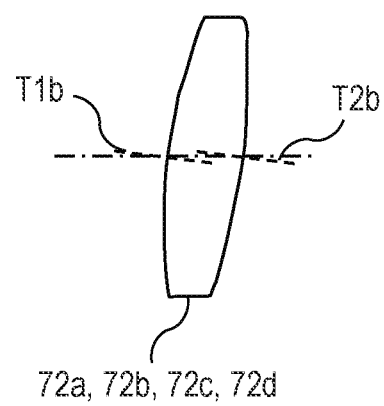
FIG. 3B is a sub-scanning cross-sectional view of each of imaging optical elements in the light scanning apparatus according to the first embodiment.

Further, FIG. 3B is a sub-scanning cross-sectional view of each of the second imaging optical elements 72a to 72d in the light scanning apparatus 100 according to the first embodiment using a perpendicularly-incident system.

As illustrated in FIG. 3A, the second imaging optical element in the related-art light scanning apparatus using the obliquely-incident system is normally designed so that a sagittal tilt angle T1a of the incident surface and a sagittal tilt angle T2a of the exit surface have different signs or have a large difference. In this manner, scanning-line curvature and 45-degree astigmatism (astigmatism in a 45-degree direction) are corrected.

Meanwhile, when such a configuration is to be used in the light scanning apparatus 100 according to the first embodiment using the perpendicularly-incident system, sagittal coma on the optical axis is increased, and thus this configuration is not preferred from the viewpoint of optical performance.

In view of the above, in the light scanning apparatus 100 according to the first embodiment, as illustrated in FIG. 3B, tilt angles T1b and T2b within the sub-scanning cross section including the optical axis of the incident surface and the exit surface of each of the second imaging optical elements 72a to 72d are set in the same direction.

In other words, in the light scanning apparatus 100 according to the first embodiment, the incident surface and the exit surface of each of the second imaging optical elements 72a to 72d have $M_{01}$ of the same sign.

Figure 4A:
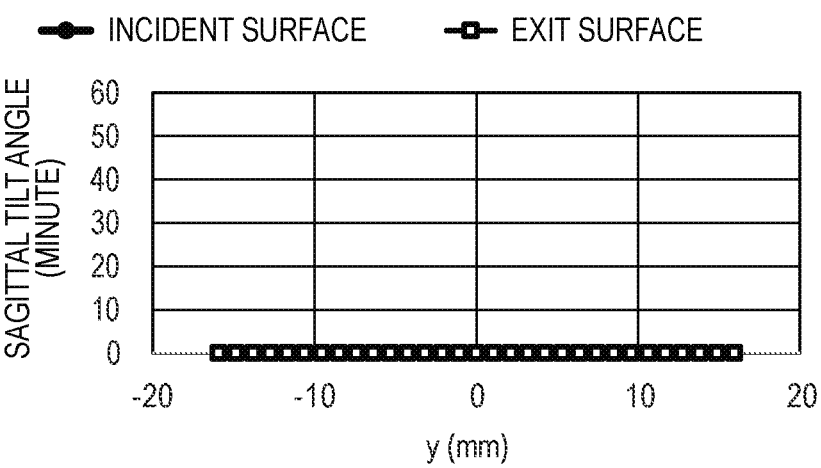
FIG. 4A is a graph for showing a main scanning direction position dependence of a sagittal tilt angle of each of optical surfaces of imaging optical elements in the related-art light scanning apparatus.

FIG. 4A is a graph for showing a main scanning direction position dependence of a sagittal tilt angle of each of incident surfaces and exit surfaces of first imaging optical elements in a light scanning apparatus according to Comparative Example.

Figure 4B:
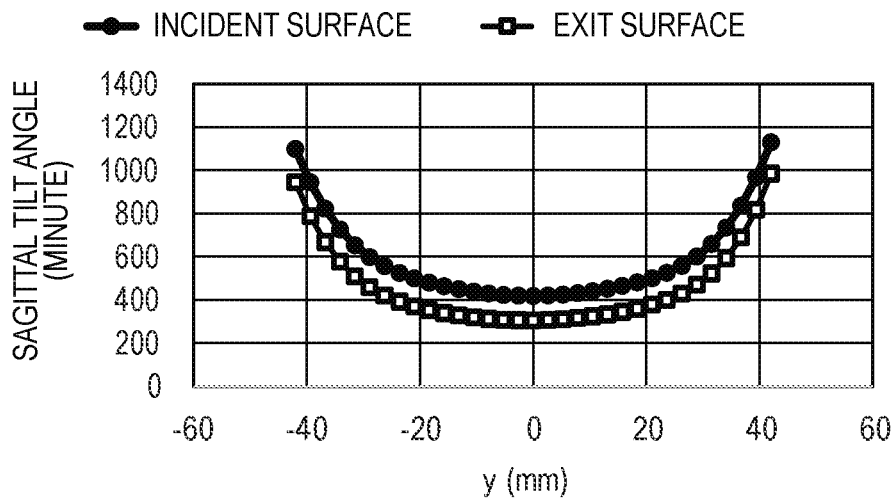
FIG. 4B is a graph for showing a main scanning direction position dependence of a sagittal tilt angle of each of optical surfaces of other imaging optical elements in the related-art light scanning apparatus.

Further, FIG. 4B is a graph for showing a main scanning direction position dependence of a sagittal tilt angle of each of incident surfaces and exit surfaces of second imaging optical elements in the light scanning apparatus according to Comparative Example.

Further, FIG. 5A, FIG. 5B, and FIG. 5C are graphs for showing image height dependences of an irradiated position, sagittal coma, and 45-degree astigmatism, respectively, corresponding to the optical performance in the light scanning apparatus according to Comparative Example.

Various characteristics of the light scanning apparatus according to Comparative Example are shown in Table 2 below. In the light scanning apparatus according to Comparative Example, the sagittal tilt angles are set so that the incident surfaces and the exit surfaces of the second imaging optical elements 72a to 72d are sagittal tilt changing surfaces.

TABLE 2

| | | | | | | Lens surface data of imaging optical system 85 | | | |
|---|---|---|---|---|---|---|---|---|---|
| | | | | | | First imaging optical element 71 | | Second imaging optical element 72 | |
| Configurations and arrangements of incident optical system 75 and imaging optical system 85 | | | | | | Incident surface | Exit surface | Incident surface | Exit surface |
| Usage wavelength | λ (nm) | 792 | Meridional line | R | | −37.250 | −22.861 | −800.000 | 149.389 |
| Number of light emitting points | n | 4 | | ky | | 1.727 | −0.878 | 0.000 | −65.422 |
| Laser cover glass, thickness | d1 (mm) | 0.250 | | B1 | | 0.000E+00 | 0.000E+00 | 0.000E+00 | 0.000E+00 |
| Laser cover glass, refractive index | n1 | 1.510 | | B2 | | 0.000E+00 | 0.000E+00 | 0.000E+00 | 0.000E+00 |
| From light emitting point of light source 1 to sub-scanning stop 31 | d2 (mm) | 14.400 | | B3 | | 0.000E+00 | 0.000E+00 | 0.000E+00 | −1.001E−07 |
| | | | | B4 | | 2.402E−06 | −3.158E−07 | 0.000E+00 | −2.286E−06 |
| From sub-scanning stop 31 to incident surface of anamorphic lens 2 | d3 (mm) | 8.801 | | B5 | | 0.000E+00 | 0.000E+00 | 0.000E+00 | −1.763E−11 |
| | | | | B6 | | 8.392E−08 | 1.482E−08 | 0.000E+00 | 1.090E−09 |
| Anamorphic lens 2, thickness | d4 (mm) | 3.000 | | B7 | | 0.000E+00 | 0.000E+00 | 0.000E+00 | 5.313E−14 |
| Anamorphic lens 2, refractive index | n2 | 1.528 | | B8 | | −1.736E−10 | 4.441E−11 | 0.000E+00 | −4.117E−13 |
| Incident surface of anamorphic lens 2, curvature radius within main scanning cross section | R1m (mm) | ∞ | | B9 | | 0.000E+00 | 0.000E+00 | 0.000E+00 | −1.841E−17 |
| | | | | B10 | | 1.540E−13 | −1.002E−13 | 0.000E+00 | 1.001E−16 |
| | | | | B11 | | 0.000E+00 | 0.000E+00 | 0.000E+00 | 2.646E−21 |
| Incident surface of anamorphic lens 2, curvature radius within sub-scanning cross section | R1s (mm) | ∞ | | B12 | | 0.000E+00 | 0.000E+00 | 0.000E+00 | −1.104E−20 |
| | | | Sagittal line | r | | 13.000 | 13.000 | 30.334 | −33.706 |
| | | | | E1 | | 0.000E+00 | 0.000E+00 | −9.367E−03 | 9.225E−03 |
| Exit surface of anamorphic lens 2, curvature radius within main scanning cross section | R2m (mm) | −13.152 | | E2 | | 0.000E+00 | −2.680E−04 | 1.441E−03 | −4.100E−04 |
| | | | | E3 | | 0.000E+00 | 0.000E+00 | −2.391E−05 | −1.336E−05 |
| | | | | E4 | | 0.000E+00 | 4.948E−06 | 9.863E−07 | 7.357E−07 |
| Exit surface of anamorphic lens 2, curvature radius within sub-scanning cross section | R2s (mm) | −9.254 | | E5 | | 0.000E+00 | 0.000E+00 | −1.008E−08 | 1.277E−08 |
| | | | | E6 | | 0.000E+00 | −2.195E−08 | −7.281E−10 | −7.738E−10 |
| | | | | E7 | | 0.000E+00 | 0.000E+00 | 3.100E−11 | −6.428E−12 |
| From exit surface of anamorphic lens 2 to main scanning stop 32 | d5 (mm) | 27.499 | | E8 | | 0.000E+00 | 3.538E−11 | −9.319E−13 | 5.834E−13 |
| | | | | E9 | | 0.000E+00 | 0.000E+00 | −1.286E−14 | 1.505E−15 |
| From main scanning stop 32 to deflection reference point | d6 (mm) | 30.700 | | E10 | | 0.000E+00 | −1.458E−14 | 9.672E−16 | −2.618E−16 |
| | | | | E11 | | 0.000E+00 | 0.000E+00 | −1.093E−18 | −1.204E−19 |
| From deflection reference point to incident surface of first imaging optical element 71 | d7 (mm) | 16.000 | | E12 | | 0.000E+00 | 0.000E+00 | −1.791E−19 | 4.662E−20 |
| | | | | m0_1 | | 0.000E+00 | 0.000E+00 | 1.222E−01 | 8.894E−02 |
| | | | | m1_1 | | 0.000E+00 | 0.000E+00 | 3.172E−05 | 7.615E−05 |
| First imaging optical element 71, thickness | d8 (mm) | 6.700 | | m2_1 | | 0.000E+00 | 0.000E+00 | 5.879E−05 | 4.315E−05 |
| | | | | m3_1 | | 0.000E+00 | 0.000E+00 | −1.085E−07 | −9.032E−08 |
| First imaging optical element 71, refractive index | n3 | 1.528 | | m4_1 | | 0.000E+00 | 0.000E+00 | −2.960E−08 | −5.956E−09 |
| | | | | m5_1 | | 0.000E+00 | 0.000E+00 | 1.175E−10 | 7.432E−11 |
| From exit surface of first imaging optical element 71 to folding mirror 7 | d9 (mm) | 26.373 | | m6_1 | | 0.000E+00 | 0.000E+00 | 4.985E−11 | 2.577E−11 |
| | | | | m7_1 | | 0.000E+00 | 0.000E+00 | −1.595E−14 | 0.000E+00 |
| From folding mirror 7 to incident surface of second imaging optical element 72 | d10 (mm) | 8.890 | | m8_1 | | 0.000E+00 | 0.000E+00 | −7.408E−15 | 0.000E+00 |
| Second imaging optical element 72, thickness | d11 (mm) | 3.500 | | | | | | | |
| Second imaging optical element 72, refractive index | n4 | 1.528 | | | | | | | |
| From deflection reference point to scanned surface 9 | (mm) | 153.848 | | | | | | | |
| Incident optical system 75, incident angle in main scanning direction | α (degree) | 87.500 | | | | | | | |
| Incident optical system 75, incident angle in sub-scanning direction | β (degree) | 0.000 | | | | | | | |
| fθ coefficient | K (mm/rad) | 134.000 | | | | | | | |
| Effective scanning angle | θ (degree) | ±46.18 | | | | | | | |
| Effective scanning width | W (mm) | ±108 | | | | | | | |
| Deflector 41, 42, number of surfaces | Surface | 4 | | | | | | | |
| Deflector 41, 42, circumradius | Rpol (mm) | 10 | | | | | | | |
| Deflector 41, 42, center position | PX (mm) | −5.747 | | | | | | | |
| Deflector 41, 42, center position | PY (mm) | −4.222 | | | | | | | |
| Aperture stop diameter | Rectangle (mm) | 2.80 × 1.40 | | | | | | | |

As shown in FIG. 4B, in the light scanning apparatus according to Comparative Example, when the sagittal tilt angles are set in the incident surfaces and the exit surfaces of the second imaging optical elements 72a to 72d so as to correct the scanning-line curvature and the 45-degree astigmatism, the sagittal tilt angles of both surfaces are increased in the vicinity of a most off-axial image height.

As a result, as shown in FIG. 5B, the sagittal coma becomes worse in the vicinity of the most off-axial image height.

Figure 6A:
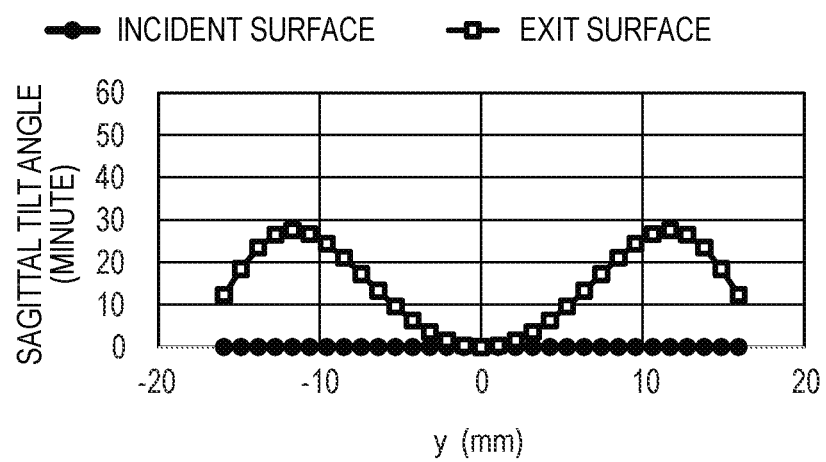
FIG. 6A is a graph for showing a main scanning direction position dependence of a sagittal tilt angle of each of optical surfaces of imaging optical elements in the light scanning apparatus according to the first embodiment.

FIG. 6A is a graph for showing a main scanning direction position dependence of the sagittal tilt angle of each of the incident surfaces and the exit surfaces of the first imaging optical elements 71a to 71d in the light scanning apparatus 100 according to the first embodiment.

Figure 6B:
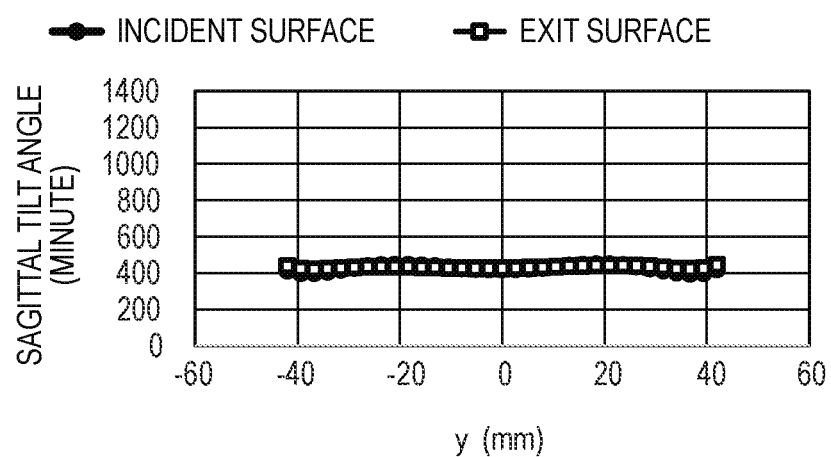
FIG. 6B is a graph for showing a main scanning direction position dependence of a sagittal tilt angle of each of optical surfaces of other imaging optical elements in the light scanning apparatus according to the first embodiment.

Further, FIG. 6B is a graph for showing a main scanning direction position dependence of the sagittal tilt angle of each of the incident surfaces and the exit surfaces of the second imaging optical elements 72a to 72d in the light scanning apparatus 100 according to the first embodiment.

Figure 7A:
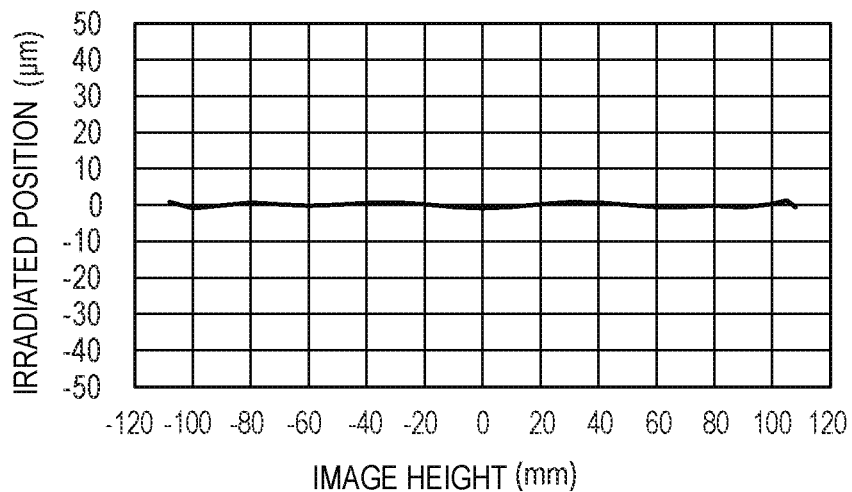
FIG. 7A is a graph for showing an image height dependence of optical performance in the light scanning apparatus according to the first embodiment.
Figure 7B:
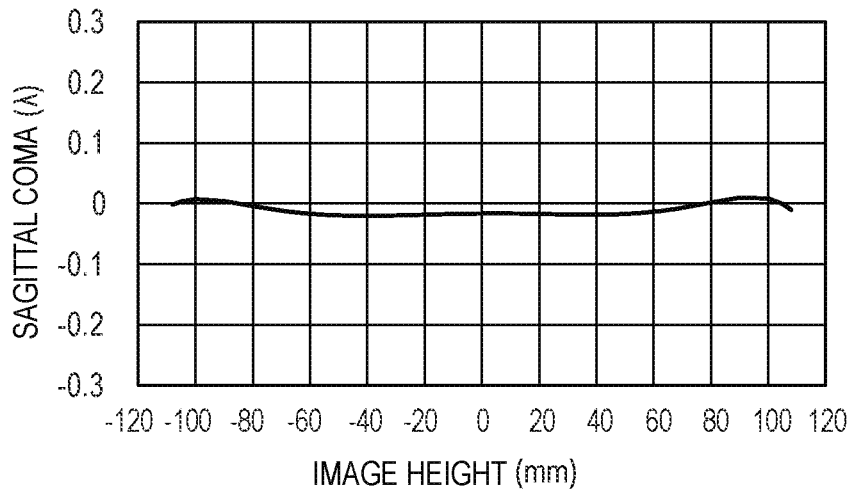
FIG. 7B is a graph for showing an image height dependence of optical performance in the light scanning apparatus according to the first embodiment.
Figure 7C:
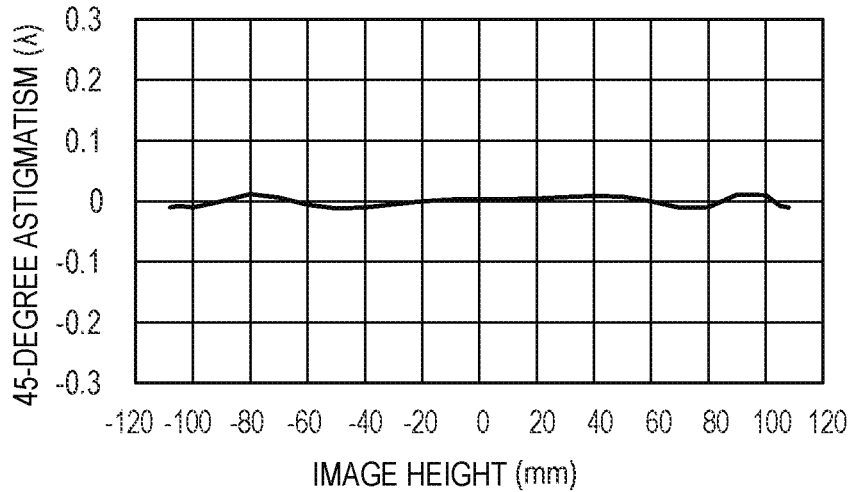
FIG. 7C is a graph for showing an image height dependence of optical performance in the light scanning apparatus according to the first embodiment.

Further, FIG. 7A, FIG. 7B, and FIG. 7C are graphs for showing image height dependences of an irradiated position, sagittal coma, and 45-degree astigmatism, respectively, corresponding to the optical performance in the light scanning apparatus 100 according to the first embodiment.

As shown in FIG. 6A, in the light scanning apparatus 100 according to the first embodiment, the sagittal tilt angles are set so that, in addition to the incident surfaces and the exit surfaces of the second imaging optical elements 72a to 72d, the exit surfaces of the first imaging optical elements 71a to 71d are sagittal tilt changing surfaces.

Further, as shown in FIG. 6A and FIG. 6B, in the light scanning apparatus 100 according to the first embodiment, the sagittal tilt angle of each of the exit surfaces of the first imaging optical elements 71a to 71d and the sagittal tilt angle of each of the incident surfaces of the second imaging optical elements 72a to 72d are set in the same direction.

In other words, in the light scanning apparatus 100 according to the first embodiment, when the sagittal tilt angle of each of the exit surfaces of the first imaging optical elements 71a to 71d and the sagittal tilt angle of each of the incident surfaces of the second imaging optical elements 72a to 72d are represented by $T_1$ and $T_2$, respectively, the following expression (4) is satisfied at each y-coordinate.

$$T_1 \times T_2 \geq 0 \quad (4)$$

As a result, in the light scanning apparatus 100 according to the first embodiment, as shown in FIG. 7A, FIG. 7B, and FIG. 7C, each type of optical performance, that is, the irradiated position, the sagittal coma, and the 45-degree astigmatism can be satisfactorily corrected.

Accordingly, when the above-mentioned configuration is adopted in the light scanning apparatus 100 according to the first embodiment, the optical performance can be satisfactorily corrected while occurrence of ghost and return light to be caused by reflection light reflected by the second imaging optical elements 72a to 72d is suppressed.

As described above, according to the light scanning apparatus 100 of the first embodiment, reduction of ghost and return light and correction of the optical performance can be both achieved, and thus a satisfactory image can be easily formed when the light scanning apparatus 100 is used in an image forming apparatus.

Second Embodiment

Figure 8A:
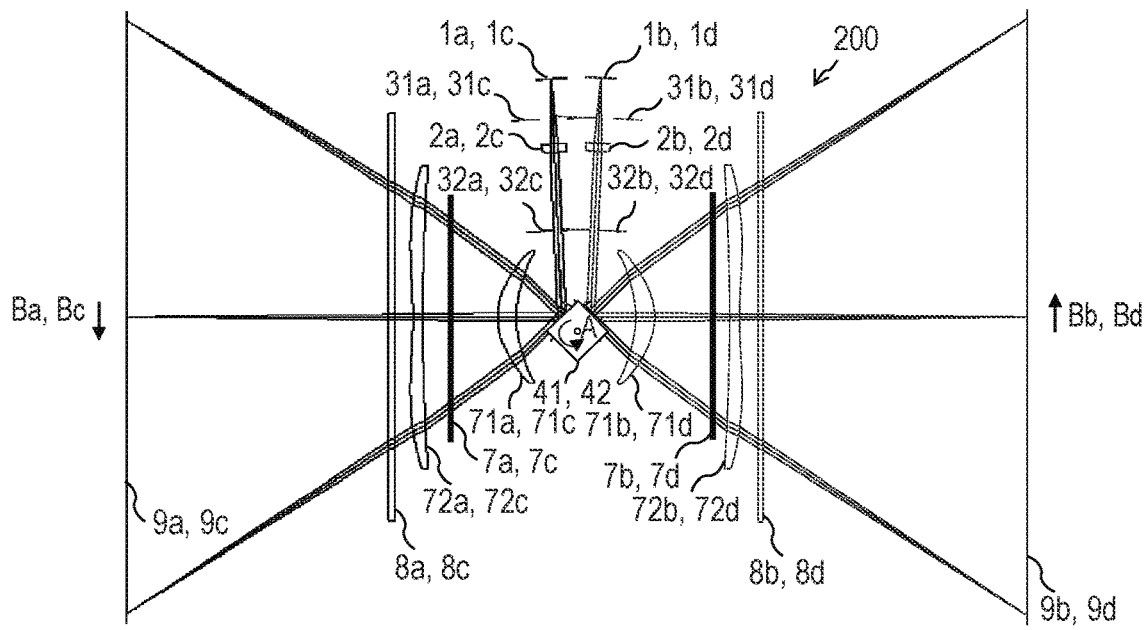
FIG. 8A is a developed view within a main scanning cross section of a light scanning apparatus according to a second embodiment.
Figure 8B:
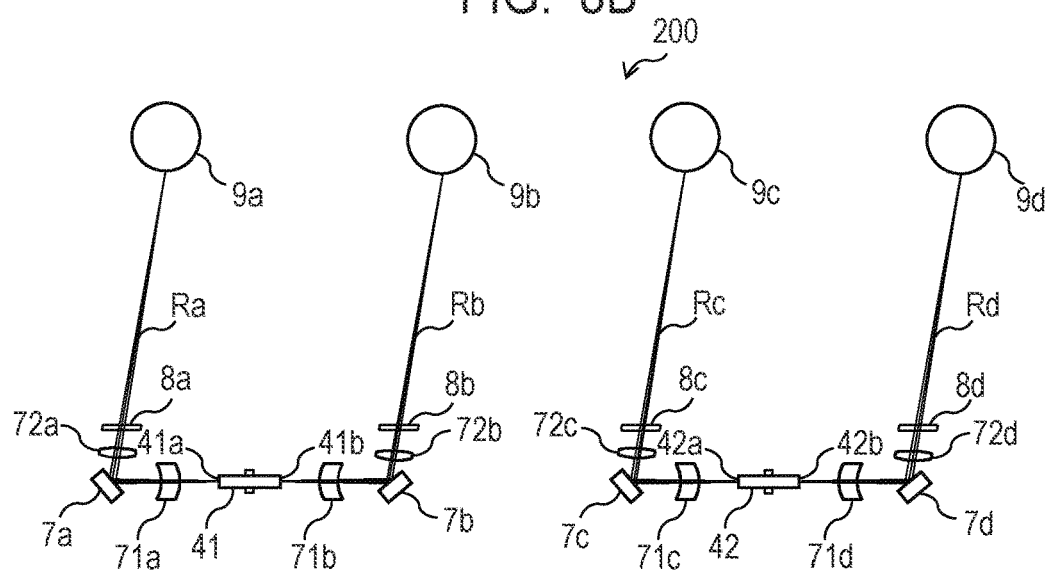
FIG. 8B is a sub-scanning cross-sectional view of the light scanning apparatus according to the second embodiment.
Figure 8C:
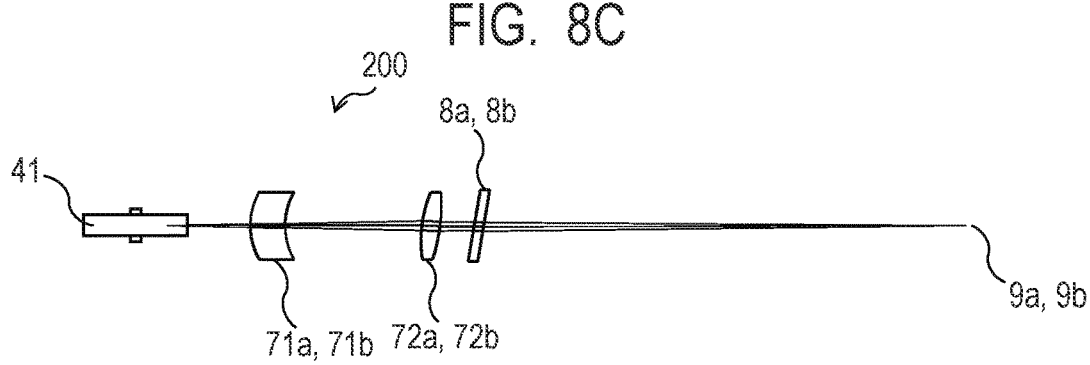
FIG. 8C is a developed view within a sub-scanning cross section of the light scanning apparatus according to the second embodiment.

FIG. 8A, FIG. 8B, and FIG. 8C are a developed view within a main scanning cross section, a sub-scanning cross-sectional view, and a developed view within a sub-scanning cross section, respectively, of a light scanning apparatus 200 according to a second embodiment.

The light scanning apparatus 200 according to the second embodiment has the same configuration as that of the light scanning apparatus 100 according to the first embodiment except that dust-proof glasses 8a to 8d are provided. Like members are thus denoted by like reference symbols, and description thereof is omitted.

Various characteristics of the first to fourth incident optical systems 75a to 75d and the first to fourth imaging optical systems 85a to 85d of the light scanning apparatus 200 according to the second embodiment are shown in Table 3 below.

The aspherical shapes of the incident surfaces and the exit surfaces of the first imaging optical elements 71a to 71d and the second imaging optical elements 72a to 72d provided in the light scanning apparatus 200 according to the second embodiment are represented by the above-mentioned expressions (1) to (3) similarly to the light scanning apparatus 100 according to the first embodiment.

TABLE 3

| | | | | | Lens surface data of imaging optical system 85 | | | |
|---|---|---|---|---|---|---|---|---|
| | | | | | First imaging optical element 71 | | Second imaging optical element 72 | |
| Configurations and arrangements of incident optical system 75 and imaging optical system 85 | | | | | Incident surface | Exit surface | Incident surface | Exit surface |
| Usage wavelength | λ (nm) | 792 | Meridional line | R | −34.167 | −21.678 | −800.000 | 138.951 |
| Number of light emitting points | n | 4 | | ky | −0.679 | −1.061 | 0.000 | −68.124 |
| Laser cover glass, thickness | d1 (mm) | 0.250 | | B1 | 0.000E+00 | 0.000E+00 | 0.000E+00 | 0.000E+00 |
| Laser cover glass, refractive index | n1 | 1.510 | | B2 | 0.000E+00 | 0.000E+00 | 0.000E+00 | 0.000E+00 |
| From light emitting point of light source 1 to sub-scanning stop 31 | d2 (mm) | 14.400 | | B3 | 0.000E+00 | 0.000E+00 | 0.000E+00 | −1.023E−07 |
| | | | | B4 | 7.038E−06 | 2.828E−06 | 0.000E+00 | −2.328E−06 |
| From sub-scanning stop 31 to incident surface of anamorphic lens 2 | d3 (mm) | 8.801 | | B5 | 0.000E+00 | 0.000E+00 | 0.000E+00 | −3.161E−11 |
| | | | | B6 | 2.360E−08 | 4.345E−09 | 0.000E+00 | 1.131E−09 |
| Anamorphic lens 2, thickness | d4 (mm) | 3.000 | | B7 | 0.000E+00 | 0.000E+00 | 0.000E+00 | 4.021E−14 |
| Anamorphic lens 2, refractive index | n2 | 1.528 | | B8 | −5.712E−11 | 3.708E−11 | 0.000E+00 | −4.351E−13 |
| Incident surface of anamorphic lens 2, curvature radius within main scanning cross section | R1m (mm) | ∞ | | B9 | 0.000E+00 | 0.000E+00 | 0.000E+00 | −1.380E−17 |
| | | | | B10 | 8.294E−15 | −8.422E−14 | 0.000E+00 | 1.040E−16 |
| | | | | B11 | 0.000E+00 | 0.000E+00 | 0.000E+00 | 2.135E−21 |
| Incident surface of anamorphic lens 2, curvature radius within sub-scanning cross section | R1s (mm) | ∞ | | B12 | 0.000E+00 | 0.000E+00 | 0.000E+00 | −1.107E−20 |
| | | | Sagittal line | r | 13.000 | 13.000 | 23.647 | −49.374 |
| | | | | E1 | 0.000 | 0.000 | −0.004 | 0.007 |

TABLE 3-continued

| | | | | | | | |
|---|---|---|---|---|---|---|---|
| Exit surface of anamorphic lens 2, curvature radius within main scanning cross section | R2m (mm) | −13.152 | E2 | 0.000E+00 | −4.892E−04 | 7.283E−04 | −1.405E−04 |
| | | | E3 | 0.000E+00 | 0.000E+00 | −4.008E−06 | −7.591E−06 |
| | | | E4 | 0.000E+00 | 4.864E−06 | 1.121E−07 | 4.467E−08 |
| Exit surface of anamorphic lens 2, curvature radius within sub-scanning cross section | R2s (mm) | −9.254 | E5 | 0.000E+00 | 0.000E+00 | 8.167E−10 | 5.574E−09 |
| | | | E6 | 0.000E+00 | −1.650E−08 | −2.397E−10 | 5.865E−11 |
| | | | E7 | 0.000E+00 | 0.000E+00 | 4.603E−12 | −3.988E−12 |
| From exit surface of anamorphic lens 2 to main scanning stop 32 | d5 (mm) | 27.499 | E8 | 0.000E+00 | 2.665E−11 | 1.015E−13 | −7.628E−14 |
| | | | E9 | 0.000E+00 | 0.000E+00 | −3.681E−15 | 1.813E−15 |
| From main scanning stop 32 to deflection reference point | d6 (mm) | 30.700 | E10 | 0.000E+00 | −1.267E−14 | 4.736E−17 | 2.266E−17 |
| | | | E11 | 0.000E+00 | 0.000E+00 | 6.333E−19 | −3.150E−19 |
| From deflection reference point to incident surface of first imaging optical element 71 | d7 (mm) | 16.000 | E12 | 0.000E+00 | 0.000E+00 | −1.958E−20 | −1.139E−21 |
| | | | m0_1 | 0.000E+00 | 0.000E+00 | 1.222E−01 | 1.239E−01 |
| | | | m1_1 | 0.000E+00 | 0.000E+00 | 1.050E−05 | 3.144E−05 |
| First imaging optical element 71, thickness | d8 (mm) | 6.700 | m2_1 | 0.000E+00 | 1.423E−04 | 8.238E−05 | 3.921E−05 |
| | | | m3_1 | 0.000E+00 | 0.000E+00 | −5.448E−08 | −1.635E−08 |
| First imaging optical element 71, refractive index | n3 | 1.528 | m4_1 | 0.000E+00 | −3.019E−07 | −1.271E−07 | −4.858E−08 |
| | | | m5_1 | 0.000E+00 | 0.000E+00 | −9.715E−11 | −1.158E−10 |
| From exit surface of first imaging optical element 71 to folding mirror 7 | d9 (mm) | 26.373 | m6_1 | 0.000E+00 | −1.535E−09 | 6.320E−11 | 1.667E−11 |
| | | | m7_1 | 0.000E+00 | 0.000E+00 | 5.118E−14 | 4.528E−14 |
| From folding mirror 7 to incident surface of second imaging optical element 72 | d10 (mm) | 8.890 | m8_1 | 0.000E+00 | 3.510E−12 | −1.734E−14 | −4.154E−15 |
| | | | m9_1 | 0.000E+00 | 0.000E+00 | −5.088E−18 | −3.476E−18 |
| | | | m10_1 | 0.000E+00 | 0.000E+00 | 2.107E−18 | 4.964E−19 |
| Second imaging optical element 72, thickness | d11 (mm) | 3.500 | m0_4 | 0.000E+00 | 0.000E+00 | 0.000E+00 | −1.377E−04 |
| | | | m1_4 | 0.000E+00 | 0.000E+00 | 0.000E+00 | 5.070E−06 |
| Second imaging optical element 72, refractive index | n4 | 1.528 | m2_4 | 0.000E+00 | 0.000E+00 | 0.000E+00 | 2.746E−07 |
| | | | m3_4 | 0.000E+00 | 0.000E+00 | 0.000E+00 | −3.784E−09 |
| Dust-proof glass 8, thickness | d12 (mm) | 1.800 | m4_4 | 0.000E+00 | 0.000E+00 | 0.000E+00 | −1.484E−10 |
| Dust-proof glass 8, refractive index | n5 | 1.510 | m5_4 | 0.000E+00 | 0.000E+00 | 0.000E+00 | 8.911E−13 |
| Dust-proof glass 8, inclination | γ (degree) | 9.600 | m6_4 | 0.000E+00 | 0.000E+00 | 0.000E+00 | 3.737E−14 |
| From deflection reference point to scanned surface 9 | (mm) | 153.848 | | | | | |
| Incident optical system 75, incident angle in main scanning direction | α (degree) | 87.500 | | | | | |
| Incident optical system 75, incident angle in sub-scanning direction | β (degree) | 0.000 | | | | | |
| fθ coefficient | K (mm/rad) | 134.000 | | | | | |
| Effective scanning angle | θ (degree) | ±46.18 | | | | | |
| Effective scanning width | W (mm) | ±108 | | | | | |
| Deflector 41, 42, number of surfaces | Surface | 4 | | | | | |
| Deflector 41, 42, circumradius | Rpol (mm) | 10 | | | | | |
| Deflector 41, 42, center position | PX (mm) | −5.747 | | | | | |
| Deflector 41, 42, center position | PY (mm) | −4.222 | | | | | |
| Aperture stop diameter | Rectangle (mm) | 2.80 × 1.40 | | | | | |

As illustrated in FIG. 8A to FIG. 8C, in the light scanning apparatus 200 according to the second embodiment, the dust-proof glasses 8a, 8b, 8c, and 8d (transmitting members) having no power and being configured to suppress entry of dust, toner, or the like are each provided between corresponding one of the second imaging optical elements 72a to 72d and corresponding one of the scanned surfaces 9a to 9d.

Further, as shown in Table 3, the dust-proof glasses 8a to 8d are each arranged to be inclined by 9.6 degrees with respect to the optical axis of corresponding one of the first to fourth imaging optical systems 85a to 85d.

In this manner, as illustrated in FIG. 8C, the dust-proof glasses 8a to 8d are each inclined in the same direction as the direction of the sagittal tilt on the optical axis of corresponding one of the second imaging optical elements 72a to 72d.

In other words, a normal to the optical surface of each of the dust-proof glasses 8a to 8d on the optical axis within the sub-scanning cross section is inclined in the same direction as a normal to the incident surface and the exit surface of each of the second imaging optical elements 72a to 72d on the optical axis within the sub-scanning cross section.

Figure 9A:
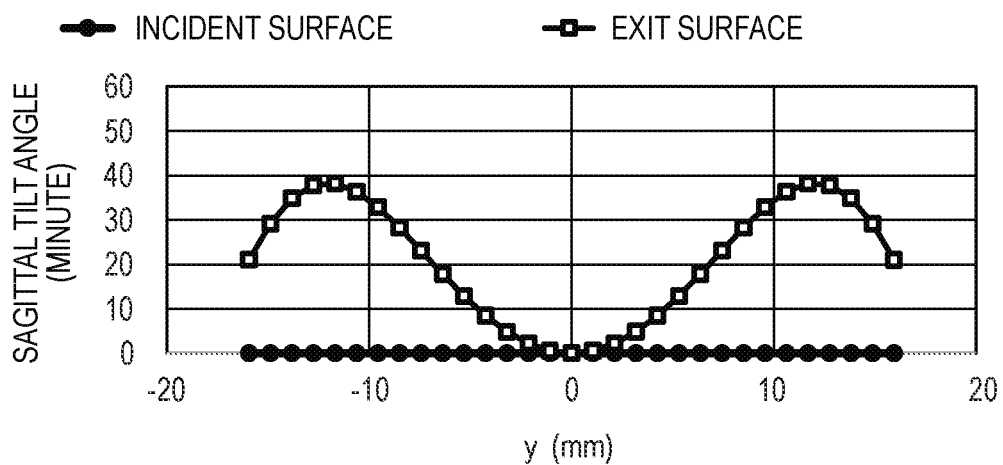
FIG. 9A is a graph for showing a main scanning direction position dependence of a sagittal tilt angle of each of optical surfaces of imaging optical elements in the light scanning apparatus according to the second embodiment.

FIG. 9A is a graph for showing a main scanning direction position dependence of the sagittal tilt angle of each of the incident surfaces and the exit surfaces of the first imaging optical elements 71a to 71d in the light scanning apparatus 200 according to the second embodiment.

Figure 9B:
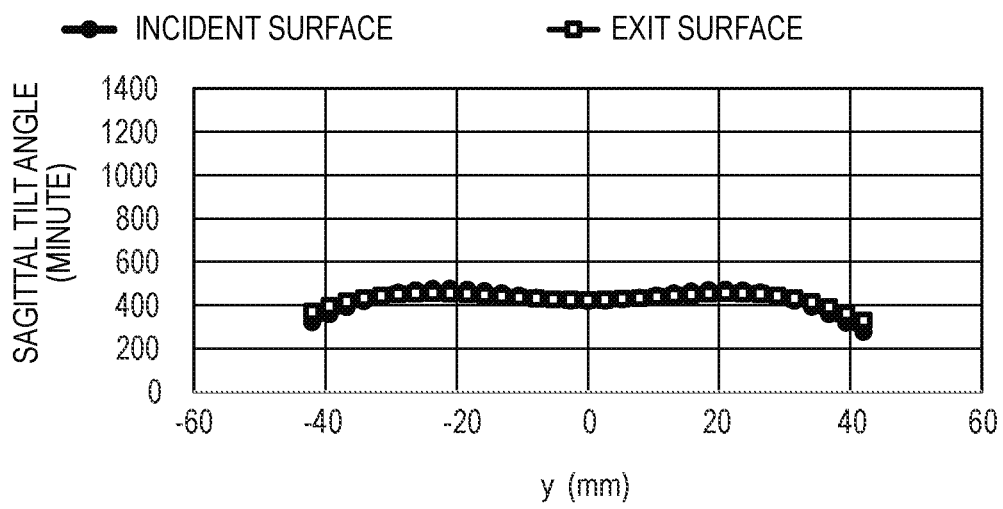
FIG. 9B is a graph for showing a main scanning direction position dependence of a sagittal tilt angle of each of optical surfaces of other imaging optical elements in the light scanning apparatus according to the second embodiment.

Further, FIG. 9B is a graph for showing a main scanning direction position dependence of the sagittal tilt angle of each of the incident surfaces and the exit surfaces of the second imaging optical elements 72a to 72d in the light scanning apparatus 200 according to the second embodiment.

Figure 10A:
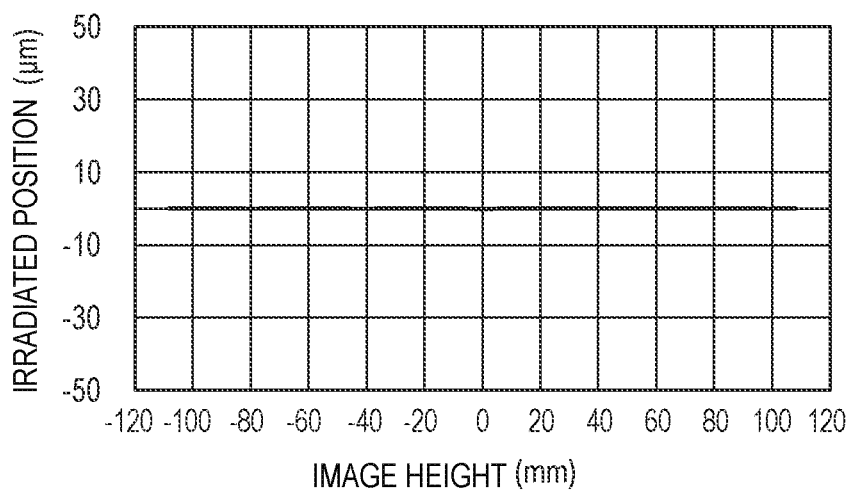
FIG. 10A is a graph for showing an image height dependence of optical performance in the light scanning apparatus according to the second embodiment.
Figure 10B:
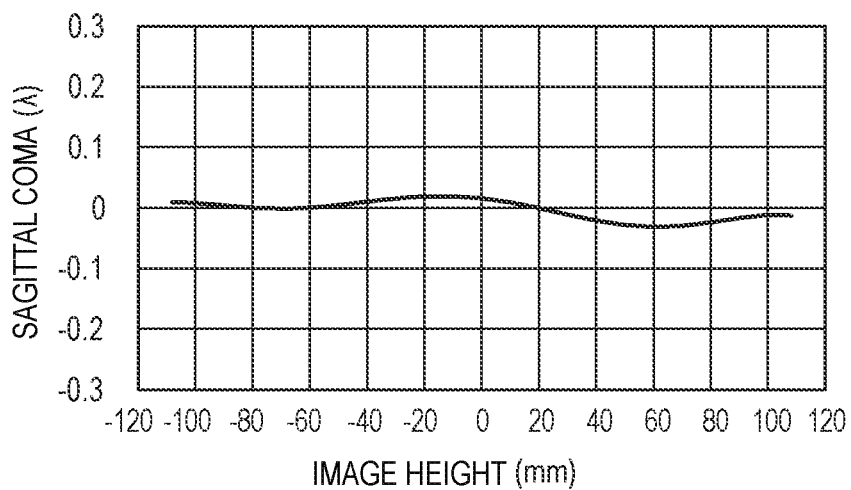
FIG. 10B is a graph for showing an image height dependence of optical performance in the light scanning apparatus according to the second embodiment.
Figure 10C:
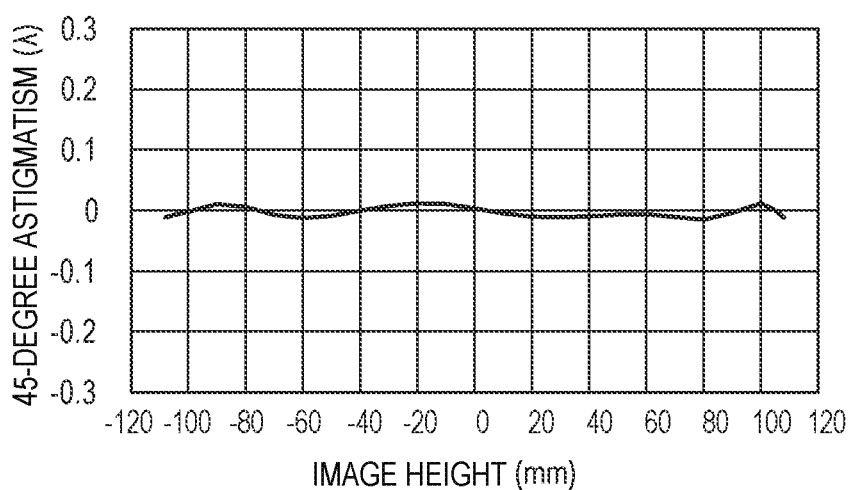
FIG. 10C is a graph for showing an image height dependence of optical performance in the light scanning apparatus according to the second embodiment.

Further, FIG. 10A, FIG. 10B, and FIG. 10C are graphs for showing image height dependences of an irradiated position, sagittal coma, and 45-degree astigmatism, respectively, corresponding to the optical performance in the light scanning apparatus 200 according to the second embodiment.

As shown in FIG. 9B, it is understood that the sagittal tilt angle in the vicinity of the most off-axial image height of each of the incident surfaces and the exit surfaces of the second imaging optical elements 72a to 72d in the light scanning apparatus 200 according to the second embodiment is reduced as compared to the case of the light scanning apparatus 100 according to the first embodiment.

Further, as shown in FIG. 10A to FIG. 10C, also in the light scanning apparatus 200 according to the second embodiment, each type of optical performance, that is, the irradiated position, the sagittal coma, and the 45-degree astigmatism can be satisfactorily corrected.

As described above, in the light scanning apparatus 200 according to the second embodiment, the dust-proof glasses 8a to 8d are provided. Further, the dust-proof glasses 8a to 8*d* are each arranged to be inclined by 9.6 degrees with respect to the optical paths in the same direction as the direction of the sagittal tilt on the optical axis of corresponding one of the second imaging optical elements 72*a* to 72*d*.

In this manner, while the sagittal tilt angle in the vicinity of the most off-axial image height of each of the incident surfaces and the exit surfaces of the second imaging optical elements 72*a* to 72*d* is reduced, occurrence of ghost and return light to be caused by the reflection light reflected by the second imaging optical elements 72*a* to 72*d* can be suppressed, and further the optical performance can be satisfactorily corrected.

As described above, according to the light scanning apparatus 200 of the second embodiment, reduction of ghost and return light and correction of the optical performance can be both achieved, and thus a satisfactory image can be easily formed when the light scanning apparatus 200 is used in the image forming apparatus.

Third Embodiment

Consideration is given of a case in which, in a light scanning apparatus as those according to the first and second embodiments in which the optical surface of the imaging optical element is formed of a sagittal tilt changing surface, a multi-beam light source including a plurality of light emitting points is used.

At this time, the plurality of light emitting points are arranged so as to be spaced apart from each other in the sub-scanning direction, and hence positions at which principal rays of light fluxes emitted from the respective plurality of light emitting points enter the imaging optical element are spaced apart from each other in the sub-scanning direction.

Accordingly, a magnification with respect to each light flux within the main scanning cross section is varied. As a result, an interval between a light condensing point at an axial image height and a light condensing point at the most off-axial image height on the scanned surface to which the light flux is guided is varied among the light fluxes, and thus main scanning jitter occurs.

In view of the above, it is aimed to provide a light scanning apparatus with which such main scanning jitter can be suppressed.

Figure 11A:
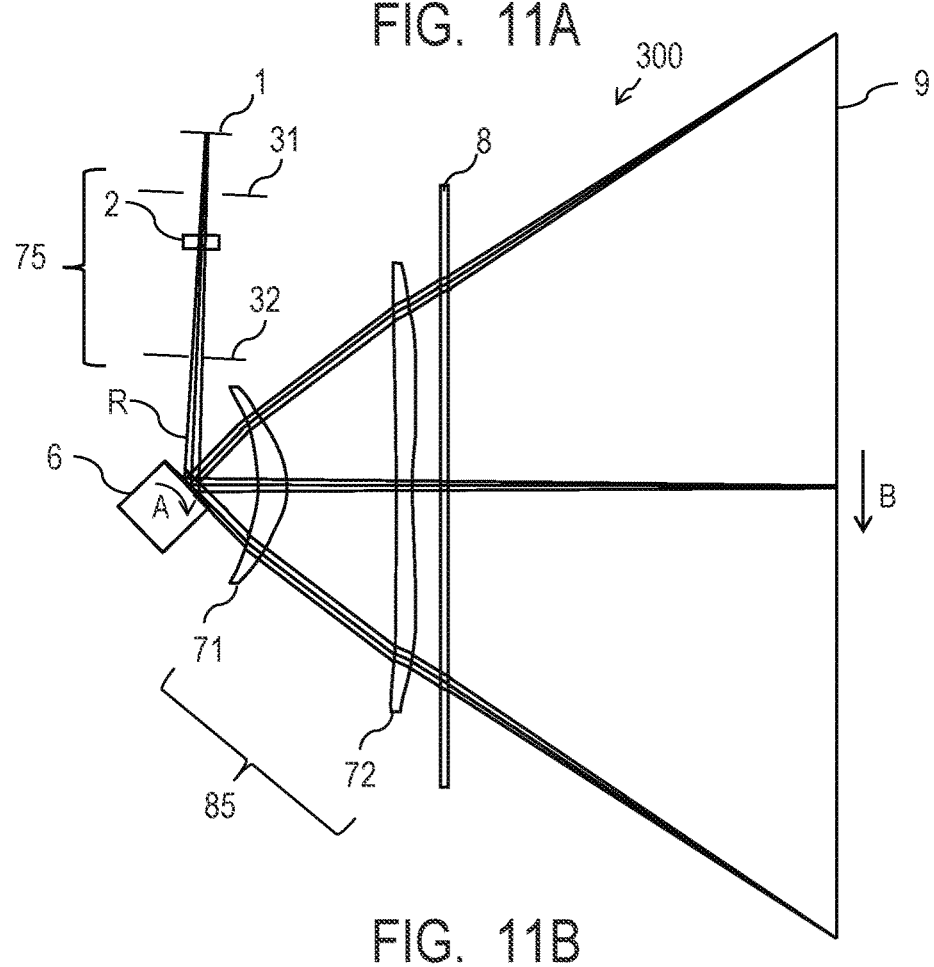
FIG. 11A is a developed view within a main scanning cross section of a light scanning apparatus according to a third embodiment.
Figure 11B:
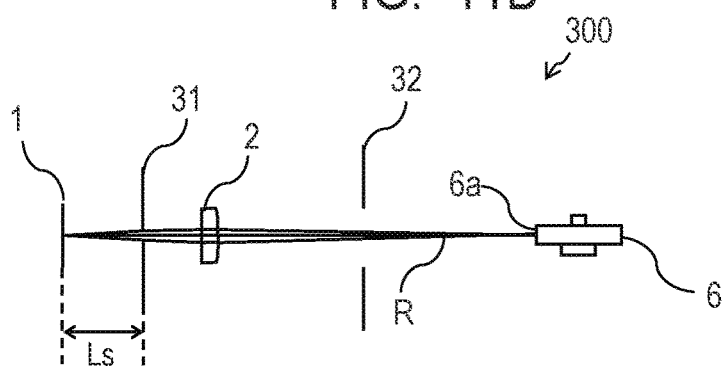
FIG. 11B is a developed view within a sub-scanning cross section of the light scanning apparatus according to the third embodiment.
Figure 11C:
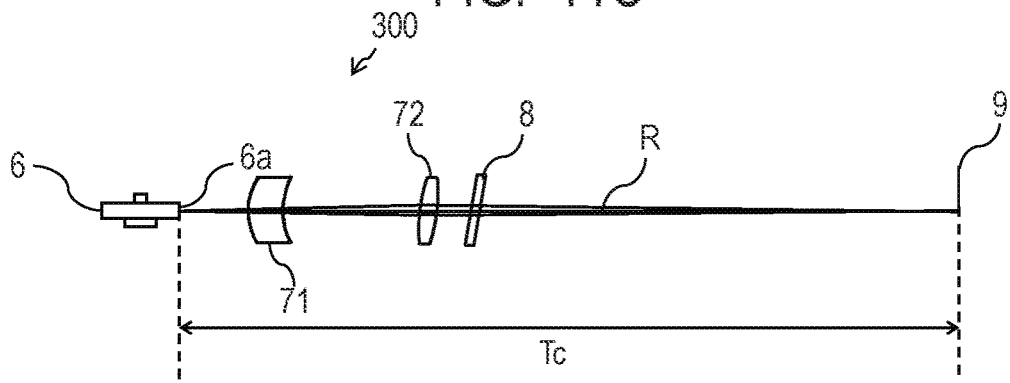
FIG. 11C is a developed view within the sub-scanning cross section of the light scanning apparatus according to the third embodiment.

FIG. 11A, FIG. 11B, and FIG. 11C are a developed view within a main scanning cross section of a light scanning apparatus 300 according to a third embodiment, a developed view within a sub-scanning cross section of an incident optical system 75, and a developed view within the sub-scanning cross section of an imaging optical system 85, respectively.

As illustrated in FIG. 11A to FIG. 11C, the light scanning apparatus 300 according to the third embodiment includes a light source 1, an anamorphic lens 2, a sub-scanning stop 31, a main scanning stop 32, a deflector 6, a first imaging optical element 71, a second imaging optical element 72, and a dust-proof glass 8.

The light source 1 includes a plurality of light emitting points, and, for example, a semiconductor laser can be used therefor. In the light scanning apparatus 300 according to the third embodiment, as described below, the light source 1 includes four light emitting points.

The anamorphic lens 2 is a lens having different positive powers (refractive powers) within the main scanning cross section and the sub-scanning cross section. The anamorphic lens 2 is configured to convert incident light fluxes into substantially parallel light fluxes within the main scanning cross section, and condense the light fluxes in the sub-scanning cross section. In this case, the substantially parallel light fluxes include weakly divergent light fluxes, weakly convergent light fluxes, and parallel light fluxes.

The sub-scanning stop 31 is configured to restrict the shape of the incident light fluxes in the sub-scanning direction (light flux width or light flux diameter in the sub-scanning direction).

The main scanning stop 32 is configured to restrict the shape of the incident light fluxes in the main scanning direction (light flux width or light flux diameter in the main scanning direction).

Accordingly, the incident light fluxes are formed into desired shapes by the sub-scanning stop 31 and the main scanning stop 32.

The deflector 6 is a rotary polygon mirror (polygon mirror) serving as a deflecting unit, and is configured to rotate at a certain speed in an arrow A direction of FIG. 11A.

The first imaging optical element 71 and the second imaging optical element 72 are, for example, imaging lenses configured to guide (condense) the incident light fluxes to a scanned surface 9.

The dust-proof glass 8 is a flat plate glass having no power and being configured to suppress entry of dust, toner, or the like into the light scanning apparatus 300.

In the light scanning apparatus 300 according to the third embodiment, the sub-scanning stop 31, the anamorphic lens 2, and the main scanning stop 32 form the incident optical system 75.

Further, in the light scanning apparatus 300 according to the third embodiment, the first imaging optical element 71 and the second imaging optical element 72 form the imaging optical system 85.

As illustrated in FIG. 11A and FIG. 11B, light fluxes R emitted from the light source 1 are restricted in shape in the sub-scanning direction by the sub-scanning stop 31.

Then, the light fluxes R that have passed through the sub-scanning stop 31 are converted into substantially parallel light fluxes within the main scanning cross section and condensed in the sub-scanning cross section by the anamorphic lens 2.

Next, the light fluxes R that have passed through the anamorphic lens 2 are restricted in shape in the main scanning direction by the main scanning stop 32.

Then, the light fluxes R that have passed through the main scanning stop 32 perpendicularly enter a deflecting surface (deflecting and reflecting surface) 6*a* of the deflector 6.

That is, the incident optical system 75 is arranged so that its optical axis is parallel to the main scanning cross section perpendicular to the rotational axis of the deflector 6.

Then, the light fluxes R emitted from the light source 1 enter the deflecting surface 6*a* of the deflector 6 within the main scanning cross section via the incident optical system 75.

In this manner, the light fluxes R are condensed within the sub-scanning cross section, and are imaged as long line images in the main scanning direction in the vicinity of the deflecting surface 6*a*.

Then, the light fluxes R reflected and deflected by the deflecting surface 6*a* of the deflector 6 are condensed (imaged as light spots) on the scanned surface 9 via the first imaging optical element 71, the second imaging optical element 72, and the dust-proof glass 8.

Then, the deflector 6 is rotated in the arrow A direction of FIG. 11A, and thus the light spots scan the scanned surface 9 in an arrow B direction, to thereby form an electrostatic latent image.

Examples of the scanned surface 9 include a photosensitive drum surface.

In place of the anamorphic lens 2 used in the light scanning apparatus 300 according to the third embodiment, a collimator lens for converting the incident light fluxes into substantially parallel light fluxes and a cylindrical lens for condensing the light fluxes in the sub-scanning cross section may be used.

Further, in the light scanning apparatus 300 according to the third embodiment, the anamorphic lens 2, the first imaging optical element 71, and the second imaging optical element 72 are formed of plastic molded lenses.

Further, in the light scanning apparatus 300 according to the third embodiment, the imaging optical system 85 is formed of two imaging optical elements, but the disclosure is not limited thereto. Similar effects can be obtained even when the imaging optical system 85 is formed of three or more imaging optical elements.

Figure 12:
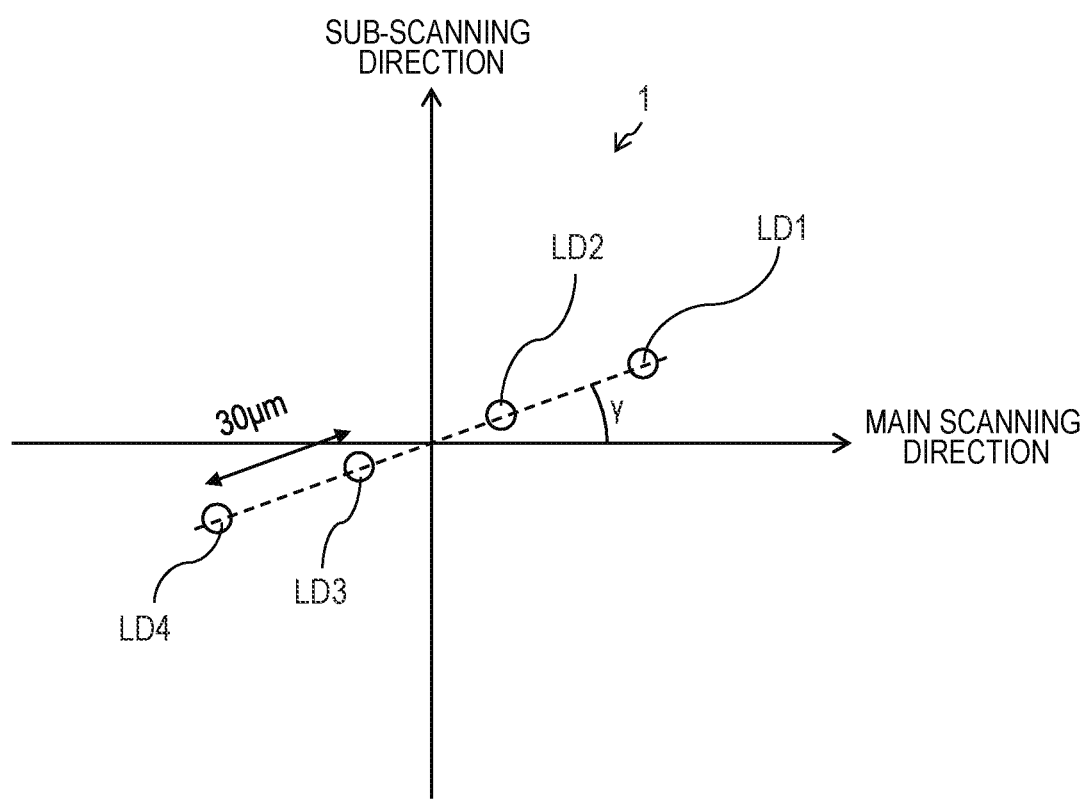
FIG. 12 is a view for illustrating an arrangement of light emitting points of a light source in the light scanning apparatus according to the third embodiment.

FIG. 12 is a view for illustrating an arrangement of light emitting points LD1, LD2, LD3, and LD4 of the light source 1 in the light scanning apparatus 300 according to the third embodiment.

As illustrated in FIG. 12, adjacent light emitting points among the light emitting points LD1 to LD4 are arranged so as to be spaced apart from each other at equal intervals within each of the main scanning cross section and the sub-scanning cross section.

Further, the light emitting points LD1 to LD4 are one-dimensionally arrayed at intervals of 30 µm along a direction forming an angle γ with respect to the main scanning direction, within a cross section which includes the main scanning direction and the sub-scanning direction, and is perpendicular to the optical axis direction.

In this case, the light scanning apparatus 300 according to the third embodiment has a configuration capable of changing a rotational angle about the optical axis, that is, the angle γ so that the interval in the sub-scanning direction of the light spots imaged on the scanned surface 9 has a desired size, depending on, for example, the resolution in the sub-scanning direction and manufacturing errors of the incident optical system 75 and the imaging optical system 85.

Next, various characteristics of the incident optical system 75 and the imaging optical system 85 of the light scanning apparatus 300 according to the third embodiment are shown in Table 4 below.

TABLE 4

| Configurations and arrangements of incident optical system 75 and imaging optical system 85 | | | | | Lens surface data of imaging optical system 85 | | | | |
|---|---|---|---|---|---|---|---|---|---|
| | | | | | | First imaging optical element 71 | | Second imaging optical element 72 | |
| | | | | | | Incident surface | Exit surface | Incident surface | Exit surface |
| Usage wavelength | $\lambda$ (nm) | 792 | Meridional | R | | −34.420 | −21.765 | −800.000 | 139.423 |
| Number of light emitting points | n | 4 | line | ky | | 0.000 | −1.179 | 0.000 | −68.939 |
| Laser rotational angle | $\gamma$ (degree) | 16 | | B1 | | 0.000E+00 | 0.000E+00 | 0.000E+00 | 0.000E+00 |
| Laser cover glass, thickness | d1 (mm) | 0.250 | | B2 | | 0.000E+00 | 0.000E+00 | 0.000E+00 | 0.000E+00 |
| Laser cover glass, refractive index | n1 | 1.510 | | B3 | | 0.000E+00 | 0.000E+00 | 0.000E+00 | −1.194E−07 |
| From light emitting point of light source 1 to sub-scanning stop 31 | d2 (mm) | 14.400 | | B4 | | 8.682E−06 | 1.618E−06 | 0.000E+00 | −2.313E−06 |
| | | | | B5 | | 0.000E+00 | 0.000E+00 | 0.000E+00 | 3.651E−11 |
| From sub-scanning stop 31 to incident surface of anamorphic lens 2 | d3 (mm) | 10.400 | | B6 | | 2.298E−08 | 1.062E−09 | 0.000E+00 | 1.118E−09 |
| | | | | B7 | | 0.000E+00 | 0.000E+00 | 0.000E+00 | 3.002E−15 |
| Anamorphic lens 2, thickness | d4 (mm) | 3.000 | | B8 | | −4.937E−11 | 4.350E−11 | 0.000E+00 | −4.272E−13 |
| Anamorphic lens 2, refractive index | n2 | 1.528 | | B9 | | 0.000E+00 | 0.000E+00 | 0.000E+00 | −1.074E−17 |
| Incident surface of anamorphic lens 2, main phase coefficient | $C_{10}$ | −0.012 | | B10 | | 2.430E−15 | −8.671E−14 | 0.000E+00 | 1.017E−16 |
| | | | | B11 | | 0.000E+00 | 0.000E+00 | 0.000E+00 | 3.012E−21 |
| Incident surface of anamorphic lens 2, sub-phase coefficient | $C_{01}$ | −0.015 | | B12 | | 0.000E+00 | 0.000E+00 | 0.000E+00 | −1.086E−20 |
| | | | Sagittal | r | | 13.000 | 13.000 | 20.100 | −78.397 |
| Exit surface of anamorphic lens 2, curvature radius within main scanning cross section | R2m (mm) | −32.381 | line | E1 | | 0.000E+00 | 0.000E+00 | −3.629E−03 | 1.208E−02 |
| | | | | E2 | | 0.000E+00 | −6.263E−04 | 6.127E−04 | −2.598E−04 |
| | | | | E3 | | 0.000E+00 | 0.000E+00 | −2.506E−06 | −1.744E−05 |
| Exit surface of anamorphic lens 2, curvature radius within sub-scanning cross section | R2s (mm) | −18.751 | | E4 | | 0.000E+00 | 6.079E−06 | 7.052E−08 | −1.302E−08 |
| | | | | E5 | | 0.000E+00 | 0.000E+00 | 2.136E−09 | 1.457E−08 |
| | | | | E6 | | 0.000E+00 | −2.342E−08 | −1.620E−10 | 2.381E−10 |
| From exit surface of anamorphic lens 2 to main scanning stop 32 | d5 (mm) | 25.900 | | E7 | | 0.000E+00 | 0.000E+00 | 1.056E−12 | −7.480E−12 |
| | | | | E8 | | 0.000E+00 | 4.329E−11 | 1.380E−14 | −1.649E−13 |
| From main scanning stop 32 to deflection reference point | d6 (mm) | 30.700 | | E9 | | 0.000E+00 | 0.000E+00 | −1.462E−15 | 2.155E−15 |
| | | | | E10 | | 0.000E+00 | −2.525E−14 | 5.373E−17 | 3.792E−17 |
| From deflection reference point to incident surface of first imaging optical element 71 | d7 (mm) | 16.000 | | E11 | | 0.000E+00 | 0.000E+00 | 3.127E−19 | −2.450E−19 |
| | | | | E12 | | 0.000E+00 | 0.000E+00 | −1.683E−20 | −1.686E−21 |
| | | | | m0_1 | | 0.000E+00 | 0.000E+00 | 1.222E−01 | 1.250E−01 |
| First imaging optical element 71, thickness | d8 (mm) | 6.700 | | m1_1 | | 0.000E+00 | 0.000E+00 | 2.554E−05 | 2.026E−06 |
| | | | | m2_1 | | 5.904E−04 | 5.636E−04 | 9.684E−05 | 4.238E−05 |
| First imaging optical element 71, refractive index | n3 | 1.528 | | m3_1 | | 0.000E+00 | 0.000E+00 | 2.570E−08 | 6.133E−08 |
| | | | | m4_1 | | −3.626E−06 | −1.141E−06 | −1.759E−07 | −6.762E−08 |
| From exit surface of first imaging optical element 71 to folding mirror | d9 (mm) | 26.373 | | m5_1 | | 0.000E+00 | 0.000E+00 | −1.998E−11 | −1.011E−10 |
| | | | | m6_1 | | 6.318E−09 | −4.677E−09 | 1.034E−10 | 2.828E−11 |
| From folding mirror to incident surface of second imaging optical element 72 | d10 (mm) | 8.890 | | m7_1 | | 0.000E+00 | 0.000E+00 | 2.553E−14 | 7.097E−14 |
| | | | | m8_1 | | −6.274E−12 | 9.288E−12 | −2.966E−14 | −5.017E−15 |
| Second imaging optical element 72, thickness | d11 (mm) | 3.500 | | | | | | | |
| Second imaging optical element 72, refractive index | n4 | 1.528 | | | | | | | |
| From deflection reference point to scanned surface 9 | (mm) | 153.848 | | | | | | | |

TABLE 4-continued

| | | |
|---|---|---|
| Incident optical system 75, incident angle in main scanning direction | α (degree) | 87.500 |
| Incident optical system 75, incident angle in sub-scanning direction | β (degree) | 0.000 |
| fθ coefficient | K (mm/rad) | 134.000 |
| Effective scanning angle | θ (degree) | ±46.18 |
| Effective scanning width | W (mm) | ±108 |
| Deflector 6, number of surfaces | Surface | 4 |
| Deflector 6, circumradius | Rpol (mm) | 10 |
| Deflector 6, center position | PX (mm) | −5.747 |
| Deflector 6, center position | PY (mm) | −4.222 |
| Sub-stop diameter | Width (mm) | 1.28 |
| Main stop diameter | Width (mm) | 2.80 |

In the light scanning apparatus 300 according to the third embodiment, a diffraction surface is formed in the incident surface of the anamorphic lens 2, and thus variations in spot diameter due to environmental variations are suppressed.

In this case, a phase coefficient of the diffraction surface formed in the incident surface of the anamorphic lens 2 is represented by the following expression (5).

$$\Phi(y, z) = \frac{2\pi}{m\lambda} \sum_{i=0, j=0} C_{ij} y^i z^j \qquad (5)$$

In this case, m represents a diffraction order, and $C_{ij}$ represents a phase coefficient. In the light scanning apparatus 300 according to the third embodiment, the diffraction order m is 1, that is, first-order diffraction light is used. This is beneficial in terms of manufacture, specifically, variations in refractive index and variations in wavelength at the time of temperature rise are canceled out.

Further, the aspherical shapes of the incident surfaces and the exit surfaces of the first imaging optical element 71 and the second imaging optical element 72 are represented by the above-mentioned expressions (1) to (3) similarly to the light scanning apparatus 100 according to the first embodiment.

Further, as shown in Table 4, in the light scanning apparatus 300 according to the third embodiment, the incident surface of the first imaging optical element 71, the exit surface of the first imaging optical element 71, the incident surface of the second imaging optical element 72, and the exit surface of the second imaging optical element 72 each have a first-order aspherical surface with respect to z.

That is, each optical surface is a sagittal tilt changing surface in which the sagittal tilt angle changes in accordance with the position y in the main scanning direction.

In other words, in the incident surface of the first imaging optical element 71, the exit surface of the first imaging optical element 71, the incident surface of the second imaging optical element 72, and the exit surface of the second imaging optical element 72, at least one of values of $M_{mn}$ is not equal to 0 provided that m is not equal to 0.

Further, as shown in Table 4, in the incident surface and the exit surface of the second imaging optical element 72, $M_{01}$ is not equal to 0.

That is, the incident surface and the exit surface of the second imaging optical element 72 have sagittal tilt angles even on the optical axis.

Accordingly, in the incident surface and the exit surface of the second imaging optical element 72, the origin in the shape definition and the surface vertex (most protruding point in the optical axis direction) do not match each other.

Next, factors causing main scanning jitter in the related-art light scanning apparatus are described.

Figure 13A:
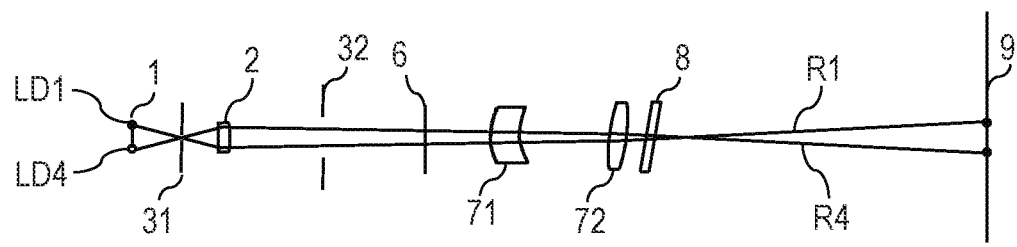
FIG. 13A is a view for illustrating a state in which main scanning jitter is caused in the related-art light scanning apparatus.
Figure 13B:
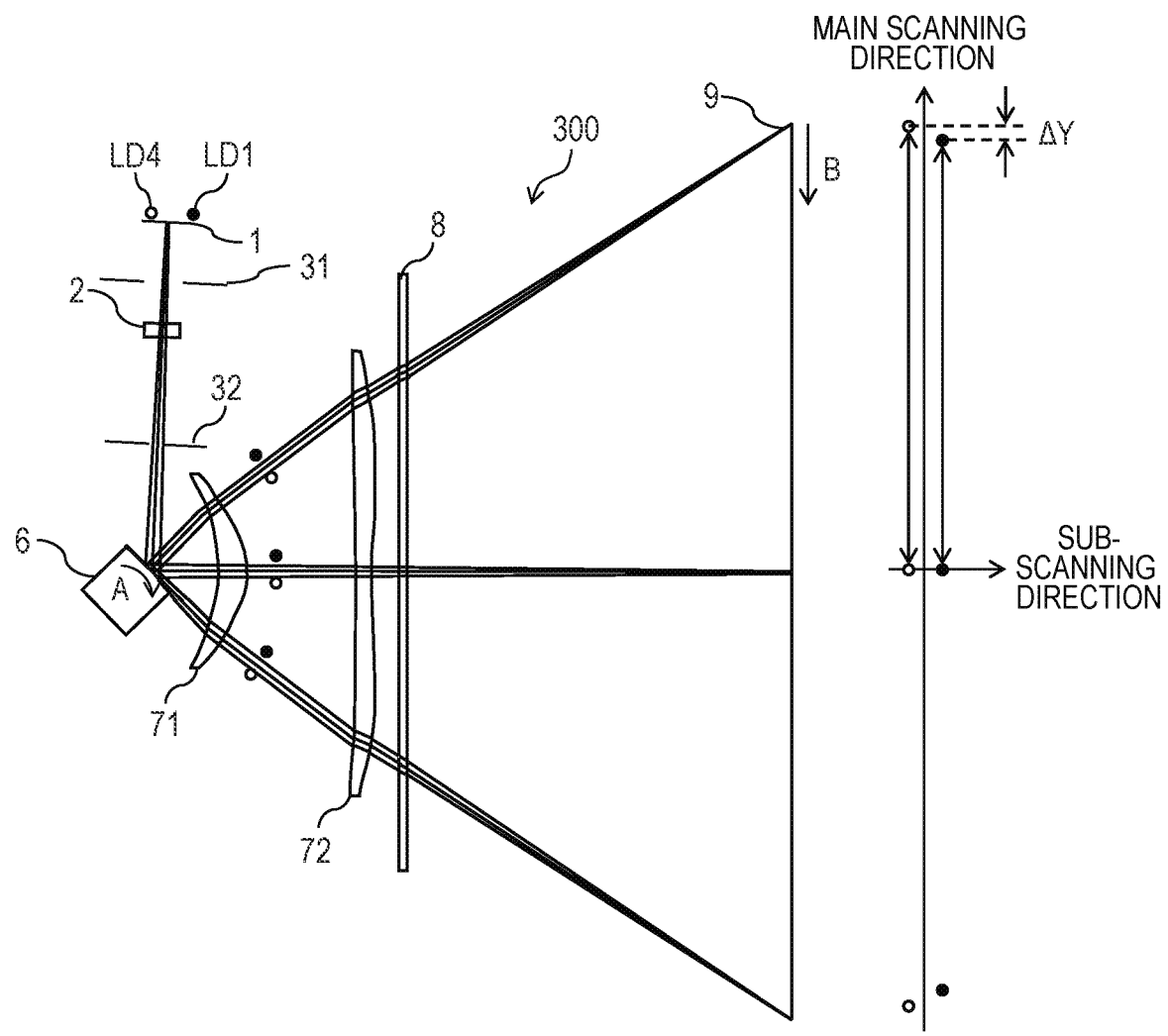
FIG. 13B is a view for illustrating a state in which main scanning jitter is caused in the related-art light scanning apparatus.

FIG. 13A and FIG. 13B are a developed view within a sub-scanning cross section and a developed view within a main scanning cross section, respectively, for illustrating loci of a plurality of light fluxes emitted from the light source 1 in the related-art light scanning apparatus.

The related-art light scanning apparatus described here has the same configuration as that of the light scanning apparatus 300 according to the third embodiment except that the various characteristics are different, and hence like members are denoted by like reference symbols to omit the description thereof.

Further, FIG. 13A and FIG. 13B show the loci of light fluxes R1 and R4 emitted from the respective light emitting points LD1 and LD4 that are most spaced apart from each other among the four light emitting points of the light source 1.

As illustrated in FIG. 13A, the light fluxes R1 and R4 emitted from the respective light emitting points LD1 and LD4 pass through the first imaging optical element 71 and the second imaging optical element 72 included in the imaging optical system 85 at different heights.

At this time, in each of the incident surfaces and the exit surfaces of the first imaging optical element 71 and the second imaging optical element 72, the curvature radius r' and the sagittal tilt angle within the sub-scanning cross section are changed in accordance with the position y in the main scanning direction.

Accordingly, when the light fluxes enter the incident surfaces and the exit surfaces of the first imaging optical element 71 and the second imaging optical element 72 at different heights, the magnification with respect to each light flux within the main scanning cross section is varied.

As a result, as illustrated in FIG. 13B, an interval between a light condensing point (that is, a light spot) at the axial image height and a light condensing point at the most off-axial image height on the scanned surface 9 is varied among the light fluxes, and thus a main scanning jitter amount ΔY is caused.

In view of the above, in the light scanning apparatus 300 according to the third embodiment, the following configuration is adopted to reduce the main scanning jitter amount ΔY.

First, a lateral magnification of the incident optical system 75 within the sub-scanning cross section is represented by Bs, and a distance on the optical axis from the light source 1 to the sub-scanning stop 31 is represented by Ls.

Further, a distance from a deflecting point CO to the scanned surface 9 is represented by Tc. The deflecting point CO (hereinafter referred to as "axial deflecting point") is a deflecting point on the deflecting surface 6a when the deflector 6 deflects the light flux (hereinafter referred to as "axial light flux") reaching the axial image height on the scanned surface 9.

At this time, in the light scanning apparatus 300 according to the third embodiment, the sub-scanning stop 31 is arranged so as to satisfy the following expression (6). In this manner, a separation amount in the sub-scanning direction of the light fluxes at the time when the light fluxes enter the incident surfaces and the exit surfaces of the first imaging optical element 71 and the second imaging optical element 72 can be reduced.

$$Ls \leq \frac{Tc}{(\beta_s)^2} \quad (6)$$

In the light scanning apparatus 300 according to the third embodiment, $\beta s=2.24$, $Ls=14.4$, and $Tc=153.85$ are obtained, and thus it is understood that the expression (6) is satisfied.

Further, in the light scanning apparatus 300 according to the third embodiment, the incident surface and the exit surface of the first imaging optical element 71 closest to the deflector 6 are sagittal tilt changing surfaces.

In this case, "the imaging optical element closest to the deflector 6" means an imaging optical element that is optically closest to the deflector 6, that is, an imaging optical element arranged at a position closest to the deflector 6 on the optical path from the deflector 6 to the scanned surface 9.

Further, the exit surface of the first imaging optical element 71 has the largest refractive power within the main scanning cross section among the incident surfaces and the exit surfaces of the first imaging optical element 71 and the second imaging optical element 72, and thus the first imaging optical element 71 is suitable for correcting the magnification within the main scanning cross section.

The above-mentioned configuration is adopted in the light scanning apparatus 300 according to the third embodiment, and thus a magnification shift within the main scanning cross section to be caused by a difference of the incident positions of the light fluxes in the sub-scanning direction on the second imaging optical element 72 can be reduced.

Figure 14:
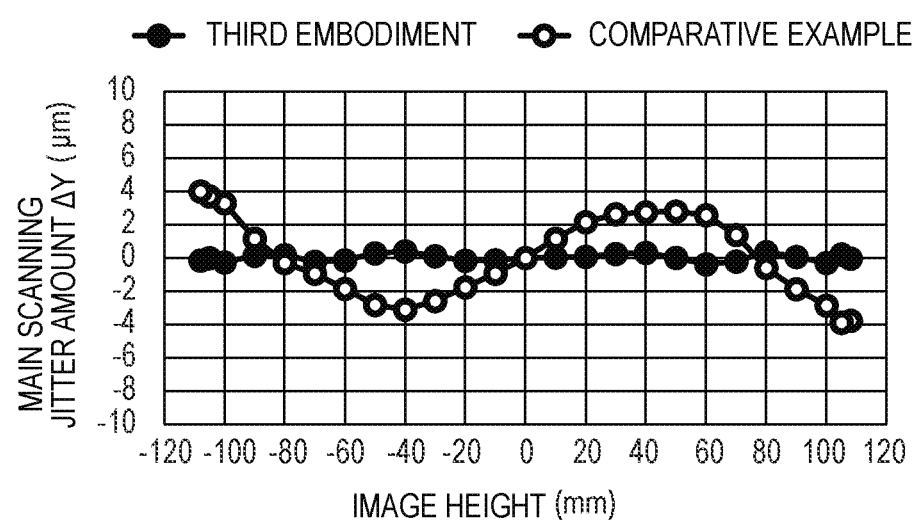
FIG. 14 is a graph for showing an image height dependence of a main scanning jitter amount in each of the light scanning apparatus according to the third embodiment and a light scanning apparatus according to Comparative Example.

FIG. 14 is a graph for showing an image height dependence of the main scanning jitter amount $\Delta Y$ in each of the light scanning apparatus 300 according to the third embodiment and a light scanning apparatus according to Comparative Example.

Various characteristics of the light scanning apparatus according to Comparative Example are shown in Table 5 below. In the light scanning apparatus according to Comparative Example, the exit surface of the first imaging optical element 71, the incident surface of the second imaging optical element 72, and the exit surface of the second imaging optical element 72 are sagittal tilt changing surfaces.

TABLE 5

| | | | | | | Lens surface data of imaging optical system 85 | | | |
|---|---|---|---|---|---|---|---|---|---|
| | | | | | | First imaging optical element 71 | | Second imaging optical element 72 | |
| Configurations and arrangements of incident optical system 75 and imaging optical system 85 | | | | | | Incident surface | Exit surface | Incident surface | Exit surface |
| Usage wavelength | λ (nm) | 792 | Meridional | R | | −32.952 | −21.329 | −800.000 | 144.020 |
| Number of light emitting points | n | 4 | line | ky | | 0.943 | −0.926 | 0.000 | −69.458 |
| Laser rotational angle | γ (degree) | 16 | | B1 | | 0.000E+00 | 0.000E+00 | 0.000E+00 | 0.000E+00 |
| Laser cover glass, thickness | d1 (mm) | 0.250 | | B2 | | 0.000E+00 | 0.000E+00 | 0.000E+00 | 0.000E+00 |
| Laser cover glass, refractive index | n1 | 1.510 | | B3 | | 0.000E+00 | 0.000E+00 | 0.000E+00 | −5.953E−08 |
| | | | | B4 | | 1.031E−05 | 2.457E−06 | 0.000E+00 | −2.415E−06 |
| From light emitting point of light source 1 to sub-scanning stop 31 | d2 (mm) | 14.400 | | B5 | | 0.000E+00 | 0.000E+00 | 0.000E+00 | −1.438E−10 |
| | | | | B6 | | 5.173E−08 | 1.224E−08 | 0.000E+00 | 1.183E−09 |
| From sub-scanning stop 31 to incident surface of anamorphic lens 2 | d3 (mm) | 10.400 | | B7 | | 0.000E+00 | 0.000E+00 | 0.000E+00 | 1.823E−13 |
| | | | | B8 | | −1.090E−10 | 3.148E−11 | 0.000E+00 | −4.554E−13 |
| | | | | B9 | | 0.000E+00 | 0.000E+00 | 0.000E+00 | −8.685E−17 |
| Anamorphic lens 2, thickness | d4 (mm) | 3.000 | | B10 | | 9.182E−14 | −7.942E−14 | 0.000E+00 | 1.084E−16 |
| Anamorphic lens 2, refractive index | n2 | 1.528 | | B11 | | 0.000E+00 | 0.000E+00 | 0.000E+00 | 1.538E−20 |
| | | | | B12 | | 0.000E+00 | 0.000E+00 | 0.000E+00 | −1.149E−20 |
| Incident surface of anamorphic lens 2, main phase coefficient | $C_{10}$ | −0.012 | Sagittal line | r | | 13.000 | 13.000 | 16.894 | −320.127 |
| | | | | E1 | | 0.000E+00 | 0.000E+00 | −4.842E−03 | 8.622E−02 |
| Incident surface of anamorphic lens 2, sub-phase coefficient | $C_{01}$ | −0.015 | | E2 | | 0.000E+00 | −6.358E−04 | 5.569E−04 | 4.785E−03 |
| | | | | E3 | | 0.000E+00 | 0.000E+00 | −3.947E−06 | 1.456E−04 |
| Exit surface of anamorphic lens 2, curvature radius within main scanning cross section | R2m (mm) | −32.381 | | E4 | | 0.000E+00 | 4.580E−06 | −1.023E−07 | 1.378E−06 |
| | | | | E5 | | 0.000E+00 | 0.000E+00 | 5.384E−09 | −7.318E−08 |
| | | | | E6 | | 0.000E+00 | −8.735E−09 | −1.057E−10 | −2.906E−09 |
| Exit surface of anamorphic lens 2, curvature radius within sub-scanning cross section | R2s (mm) | −18.751 | | E7 | | 0.000E+00 | 0.000E+00 | −1.923E−13 | −4.267E−11 |
| | | | | E8 | | 0.000E+00 | −2.814E−12 | 5.336E−14 | −3.470E−13 |
| | | | | E9 | | 0.000E+00 | 0.000E+00 | −1.238E−15 | 8.913E−16 |
| From exit surface of anamorphic lens 2 to main scanning stop 32 | d5 (mm) | 25.900 | | E10 | | 0.000E+00 | 2.797E−14 | 1.343E−17 | 3.877E−16 |
| | | | | E11 | | 0.000E+00 | 0.000E+00 | 2.885E−19 | 1.051E−17 |
| | | | | E12 | | 0.000E+00 | 0.000E+00 | −7.428E−21 | 7.829E−20 |
| From main scanning stop 32 to deflection reference point | d6 (mm) | 30.700 | | m0_1 | | 0.000E+00 | 0.000E+00 | 1.222E−01 | 1.244E−01 |
| | | | | m1_1 | | 0.000E+00 | 0.000E+00 | 4.661E−05 | 8.506E−05 |
| From deflection reference point to incident surface of first imaging optical element 71 | d7 (mm) | 16.000 | | m2_1 | | 0.000E+00 | 1.041E−04 | 4.675E−05 | 1.532E−05 |
| | | | | m3_1 | | 0.000E+00 | 0.000E+00 | −8.712E−08 | −3.439E−08 |
| | | | | m4_1 | | 0.000E+00 | −1.543E−07 | −7.620E−08 | −1.417E−08 |
| First imaging optical element 71, thickness | d8 (mm) | 6.700 | | m5_1 | | 0.000E+00 | 0.000E+00 | −9.626E−12 | −8.129E−11 |
| | | | | m6_1 | | 0.000E+00 | −1.918E−09 | 2.892E−11 | −6.270E−12 |
| First imaging optical element 71, refractive index | n3 | 1.528 | | m7_1 | | 0.000E+00 | 0.000E+00 | 2.889E−14 | 4.491E−14 |
| | | | | m8_1 | | 0.000E+00 | 4.449E−12 | −4.935E−16 | 5.761E−15 |

TABLE 5-continued

| | | |
|---|---|---|
| From exit surface of first imaging optical element 71 to folding mirror | d9 (mm) | 26.373 |
| From folding mirror to incident surface of second imaging optical element 72 | d10 (mm) | 8.890 |
| Second imaging optical element 72, thickness | d11 (mm) | 3.500 |
| Second imaging optical element 72, refractive index | n4 | 1.528 |
| From deflection reference point to scanned surface 9 | (mm) | 153.848 |
| Incident optical system 75, incident angle in main scanning direction | α (degree) | 87.500 |
| Incident optical system 75, incident angle in sub-scanning direction | β (degree) | 0.000 |
| fθ coefficient | K (mm/rad) | 134.000 |
| Effective scanning angle | θ (degree) | ±46.18 |
| Effective scanning width | W (mm) | ±108 |
| Deflector 6, number of surfaces | Surface | 4 |
| Deflector 6, circumradius | Rpol (mm) | 10 |
| Deflector 6, center position | PX (mm) | −5.747 |
| Deflector 6, center position | PY (mm) | −4.222 |
| Sub-stop diameter | Width (mm) | 1.28 |
| Main stop diameter | Width (mm) | 2.80 |

As shown in FIG. 14, it is understood that, in the light scanning apparatus 300 according to the third embodiment, the main scanning jitter amount ΔY to be caused by the difference of the incident positions of the light fluxes in the sub-scanning direction on the first imaging optical element 71 and the second imaging optical element 72 can be reduced.

As described above, in the light scanning apparatus 300 according to the third embodiment, reduction of ghost and return light and correction of the optical performance including the main scanning jitter can be both achieved, and thus a satisfactory image can be easily formed when the light scanning apparatus 300 is used in the image forming apparatus.

Fourth Embodiment

Figure 15A:
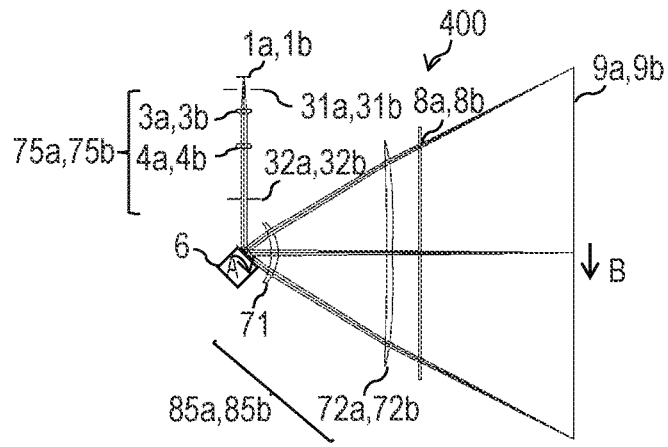
FIG. 15A is a developed view within a main scanning cross section of a light scanning apparatus according to a fourth embodiment.
Figure 15B:
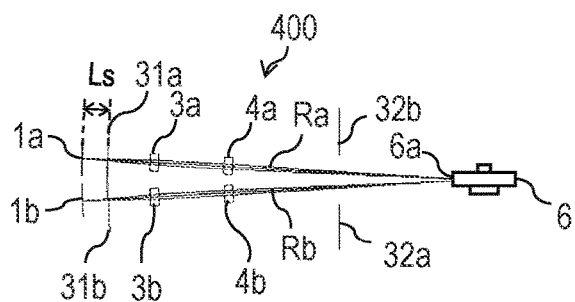
FIG. 15B is a developed view within a sub-scanning cross section of the light scanning apparatus according to the fourth embodiment.

FIG. 15A and FIG. 15B are a developed view within a main scanning cross section of a light scanning apparatus 400 according to a fourth embodiment and a developed view within a sub-scanning cross section of incident optical systems, respectively.

Figure 15C:
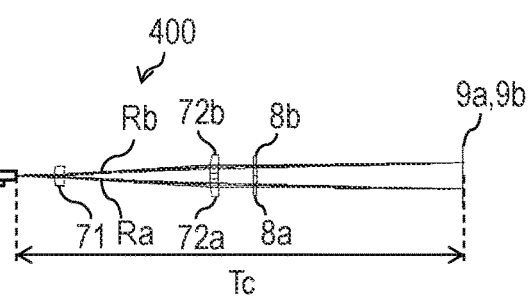
FIG. 15C is a developed view within the sub-scanning cross section of the light scanning apparatus according to the fourth embodiment.
Figure 15D:
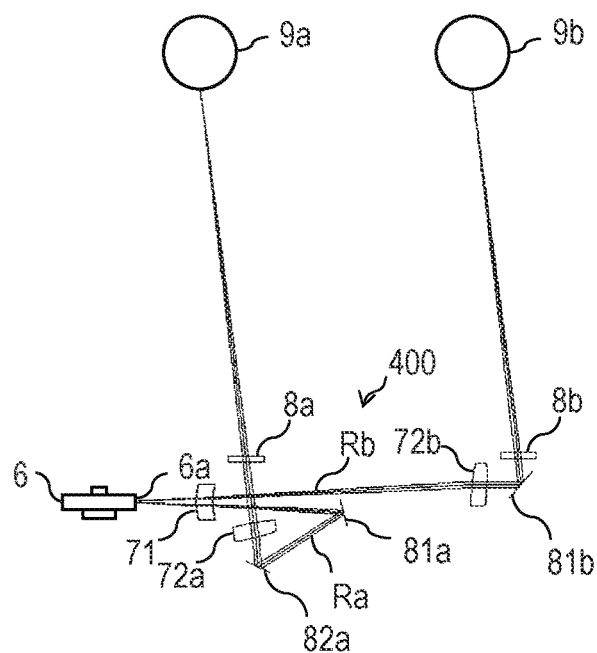
FIG. 15D is a sub-scanning cross-sectional view of the light scanning apparatus according to the fourth embodiment.

Further, FIG. 15C and FIG. 15D are a developed view within a sub-scanning cross section and a sub-scanning cross-sectional view, respectively, of imaging optical systems of the light scanning apparatus 400 according to the fourth embodiment.

As illustrated in FIG. 15A to FIG. 15D, the light scanning apparatus 400 according to the fourth embodiment includes light sources 1a and 1b, collimator lenses 3a and 3b, cylindrical lenses 4a and 4b, and sub-scanning stops 31a and 31b. The light scanning apparatus 400 according to the fourth embodiment further includes main scanning stops 32a and 32b, a deflector 6, a first imaging optical element 71, second imaging optical elements 72a and 72b, folding mirrors 81a, 81b, and 82a, and dust-proof glasses 8a and 8b.

The light sources 1a and 1b includes a plurality of light emitting points, and, for example, a semiconductor laser can be used therefor. In the light scanning apparatus 400 according to the fourth embodiment, as described below, the light sources 1a and 1b each include four light emitting points.

The collimator lenses 3a and 3b are each configured to convert incident light fluxes into substantially parallel light fluxes within the main scanning cross section. In this case, the substantially parallel light fluxes include weakly divergent light fluxes, weakly convergent light fluxes, and parallel light fluxes.

The cylindrical lenses 4a and 4b each have finite power (refractive power) within the sub-scanning cross section, and are each configured to condense the incident light fluxes within the sub-scanning cross section.

The sub-scanning stop 31a and 31b is configured to restrict the shape of the incident light fluxes in the sub-scanning direction (light flux width or light flux diameter in the sub-scanning direction).

The main scanning stop 32a and 32b is configured to restrict the shape of the incident light fluxes in the main scanning direction (light flux width or light flux diameter in the main scanning direction).

The deflector 6 is a rotary polygon mirror (polygon mirror) serving as a deflecting unit, and is configured to rotate at a certain speed in an arrow A direction of FIG. 15A.

The first imaging optical element 71a and the second imaging optical element 72a are, for example, imaging lenses configured to guide (condense) the incident light fluxes to a scanned surface 9a. Similarly, the first imaging optical element 71b and the second imaging optical element 72b are, for example, imaging lenses configured to guide (condense) the incident light fluxes to a scanned surface 9b.

The folding mirrors 81a, 81b, and 82a are configured to fold (reflect) the incident light fluxes toward the scanned surfaces 9a and 9b.

The dust-proof glasses 8a and 8b are flat plate glasses having no power and being configured to suppress entry of dust, toner, or the like into the light scanning apparatus 400.

In the light scanning apparatus 400 according to the fourth embodiment, the sub-scanning stop 31a, the collimator lens 3a, the cylindrical lens 4a, and the main scanning stop 32a form a first incident optical system 75a.

In the light scanning apparatus 400 according to the fourth embodiment, the sub-scanning stop 31b, the collimator lens 3b, the cylindrical lens 4b, and the main scanning stop 32b form a second incident optical system 75b.

Further, the first imaging optical element 71 and the second imaging optical element 72a form a first imaging optical system 85a.

Further, the first imaging optical element 71 and the second imaging optical element 72b form a second imaging optical system 85b.

As illustrated in FIG. 15A and FIG. 15B, light fluxes Ra and Rb emitted from the light sources 1a and 1b are each restricted in shape in the sub-scanning direction by the sub-scanning stop 31a and 31b.

Then, the light fluxes Ra and Rb that have passed through the respective sub-scanning stops 31a and 31b are converted into substantially parallel light fluxes within the main scanning cross section by the collimator lenses 3a and 3b, respectively.

Then, the light fluxes Ra and Rb that have passed through the respective collimator lenses 3a and 3b are condensed within the sub-scanning cross section by the cylindrical lenses 4a and 4b, respectively.

Next, the light fluxes Ra and Rb that have passed through the respective cylindrical lenses 4a and 4b are restricted in shape in the main scanning direction by the main scanning stops 32a and 32b, respectively.

Then, the light flux Ra that has passed through the main scanning stop 32a obliquely enters a deflecting surface (deflecting and reflecting surface) 6a of the deflector 6 from an upper side in the sub-scanning direction. The light flux Rb that has passed through the main scanning stop 32b obliquely enters the deflecting surface (deflecting and reflecting surface) 6a of the deflector 6 from a lower side in the sub-scanning direction.

That is, in the light scanning apparatus 400 according to the fourth embodiment, the first and second incident optical systems 75a and 75b are each arranged so that its optical axis forms an angle with respect to the main scanning cross section perpendicular to the rotational axis of the deflector 6 within the sub-scanning cross section.

Further, the light fluxes Ra and Rb emitted from the respective light sources 1a and 1b obliquely enter the deflecting surface 6a of the deflector 6 within the sub-scanning cross section via the first and second incident optical systems 75a and 75b, respectively.

In this manner, the light fluxes Ra and Rb are each condensed within the sub-scanning cross section, and are imaged as long line images in the main scanning direction in the vicinity of the deflecting surface 6a.

In the light scanning apparatus 400 according to the fourth embodiment, the optical axes of the first and second incident optical systems 75a and 75b form angles of +3.0° and −3.0°, respectively, with respect to the main scanning cross section within the sub-scanning cross section.

Then, the light flux Ra reflected and deflected by the deflecting surface 6a of the deflector 6 is condensed (imaged as a light spot) on the scanned surface 9a via the first imaging optical element 71, the folding mirrors 81a and 82a, the second imaging optical element 72a, and the dust-proof glass 8a.

Similarly, the light flux Rb reflected and deflected by the deflecting surface 6a of the deflector 6 is condensed (imaged as a light spot) on the scanned surface 9b via the first imaging optical element 71, the second imaging optical element 72b, the folding mirror 81b, and the dust-proof glass 8b.

Then, the deflector 6 is rotated in the arrow A direction of FIG. 15A, and thus the light spots scan the scanned surface 9a and 9b in an arrow B direction, to thereby form an electrostatic latent image.

Examples of the scanned surface 9a and 9b include a photosensitive drum surface.

Figure 16A:
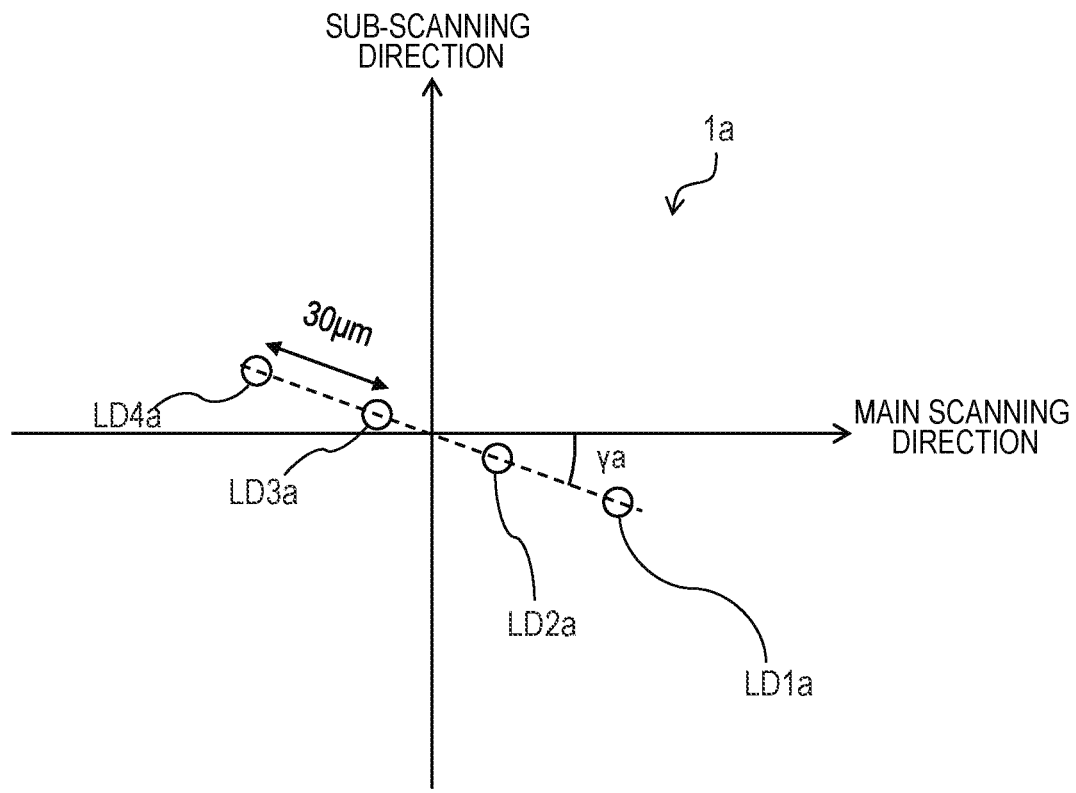
FIG. 16A is a view for illustrating an arrangement of light emitting points of a light source in the light scanning apparatus according to the fourth embodiment.

FIG. 16A is a view for illustrating an arrangement of light emitting points LD1a, LD2a, LD3a, and LD4a in the light source 1a (first light source) of the light scanning apparatus 400 according to the fourth embodiment.

Figure 16B:
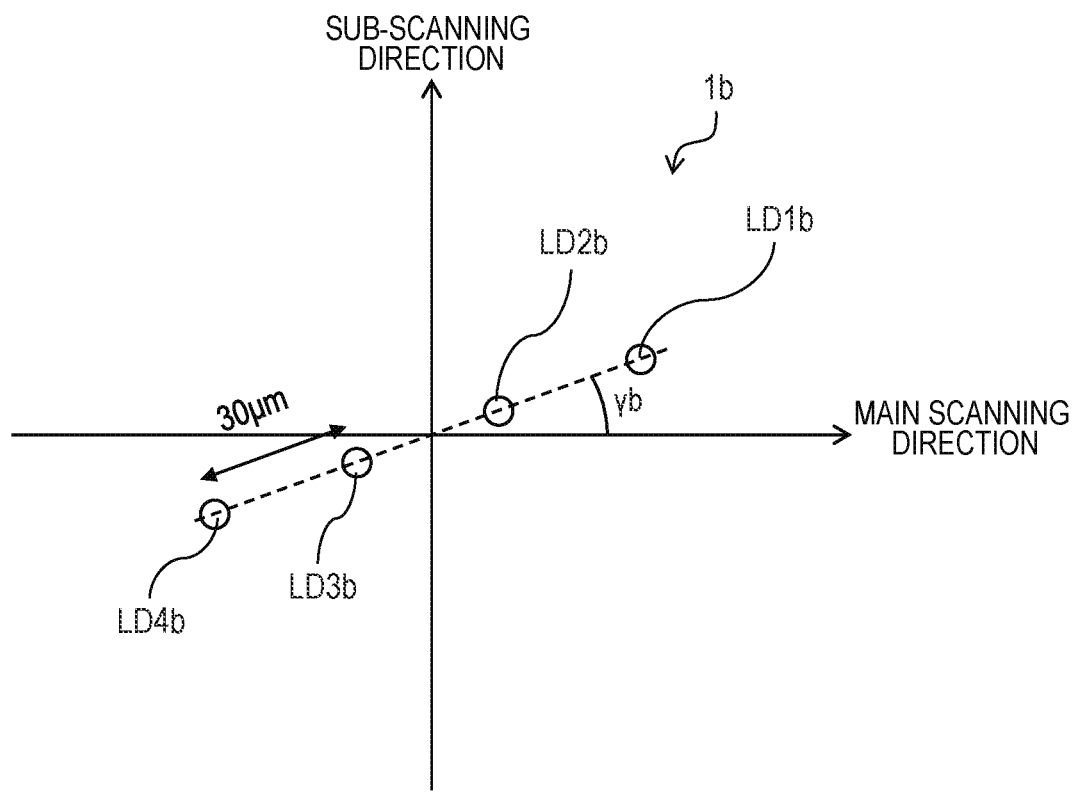
FIG. 16B is a view for illustrating an arrangement of light emitting points of another light source in the light scanning apparatus according to the fourth embodiment.

Further, FIG. 16B is a view for illustrating an arrangement of light emitting points LD1b, LD2b, LD3b, and LD4b in the light source 1b (second light source) of the light scanning apparatus 400 according to the fourth embodiment.

As illustrated in FIG. 16A, adjacent light emitting points among the light emitting points LD1a to LD4a are arranged so as to be spaced apart from each other at equal intervals within each of the main scanning cross section and the sub-scanning cross section.

Similarly, as illustrated in FIG. 16B, adjacent light emitting points among the light emitting points LD1b to LD4b are arranged so as to be spaced apart from each other at equal intervals within each of the main scanning cross section and the sub-scanning cross section.

Further, the light emitting points LD1a to LD4a are one-dimensionally arrayed at intervals of 30 μm along a direction forming an angle γa with respect to the main scanning direction, within a cross section which includes the main scanning direction and the sub-scanning direction, and is perpendicular to the optical axis direction. Further, the light emitting points LD1b to LD4b are one-dimensionally arrayed at intervals of 30 μm along a direction forming an angle γb with respect to the main scanning direction, within the cross section which includes the main scanning direction and the sub-scanning direction, and is perpendicular to the optical axis direction.

In this case, in the light scanning apparatus 400 according to the fourth embodiment, the angles γa and γb have different signs.

Figure 17:
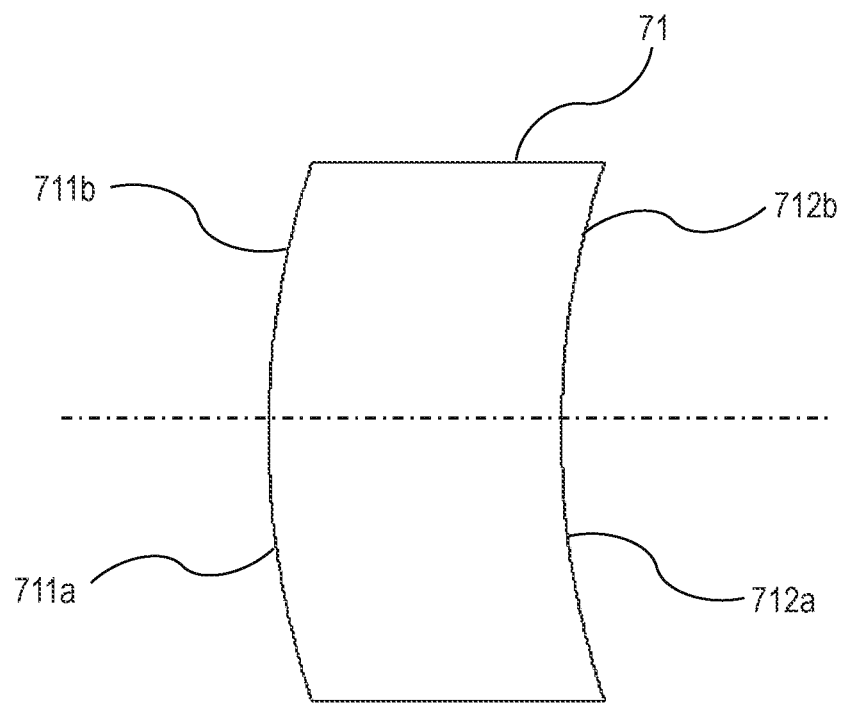
FIG. 17 is a view for illustrating a lens shape of an imaging optical element in the light scanning apparatus according to the fourth embodiment.

FIG. 17 is a view for illustrating a lens shape of the first imaging optical element 71 in the light scanning apparatus 400 according to the fourth embodiment.

As illustrated in FIG. 17, on the incident side of the first imaging optical element 71, a first incident surface 711b and a second incident surface 711a are arranged side by side in the sub-scanning direction. The light flux Rb enters the first incident surface 711b, and the light flux Ra enters the second incident surface 711a.

Further, on the exit side of the first imaging optical element 71, a first exit surface 712b and a second exit surface 712a are arranged side by side in the sub-scanning direction. The light flux Rb exits from the first exit surface 712b, and the light flux Ra exits from the second exit surface 712a.

That is, in the light scanning apparatus 400 according to the fourth embodiment, the first imaging optical element 71 is formed as a multi-level lens through which the light fluxes Ra and Rb pass on the lower side and the upper side in the sub-scanning direction, respectively.

Next, various characteristics of the first and second incident optical systems 75a and 75b and the first and second imaging optical systems 85a and 85b of the light scanning apparatus 400 according to the fourth embodiment are shown in Table 6 below. Coefficients are all 0 unless otherwise noted.

TABLE 6

Configurations and arrangements of incident optical system 75 and imaging optical system 85

| | | |
|---|---|---|
| Usage wavelength | λ (nm) | 790 |
| Number of light emitting points | N | 4 |
| Laser rotational angle | γ (degree) | 20 |
| Laser cover glass, thickness | d1 (mm) | 0.250 |
| Laser cover glass, refractive index | n1 | 1.510 |
| From light emitting point of light source 1 to sub-scanning stop 31 | d2 (mm) | 9.900 |
| From sub-scanning stop 31 to incident surface of collimator lens 3 | d3 (mm) | 23.100 |
| Collimator lens 3, thickness | d4 (mm) | 3.000 |
| Collimator lens 3, refractive index | n2 | 1.772 |
| Incident surface of collimator lens 3, curvature radius within main scanning cross section | R1m (mm) | ∞ |
| Incident surface of collimator lens 3, curvature radius within sub-scanning cross section | R1s (mm) | ∞ |
| Exit surface of collimator lens 3, curvature radius within main scanning cross section | R2m (mm) | −19.046 |
| Exit surface of collimator lens 3, curvature radius within sub-scanning cross section | R2s (mm) | −19.046 |
| From exit surface of collimator lens 3 to incident surface of cylindrical lens 4 | d5 (mm) | 21.98 |
| Cylindrical lens 4, thickness | d6 (mm) | 3.000 |
| Cylindrical lens 4, refractive index | n3 | 1.528 |
| Incident surface of cylindrical lens 4, curvature radius within main scanning cross section | R3m (mm) | 00 |
| Incident surface of cylindrical lens 4, curvature radius within sub-scanning cross section | R3s (mm) | 58.620 |
| Exit surface of cylindrical lens 4, main phase coefficient | $C_{10}$ | 0.000 |
| Exit surface of cylindrical lens 4, sub-phase coefficient | $C_{01}$ | −0.002 |
| From exit surface of cylindrical lens 4 to main scanning stop 32 | d7 (mm) | 37.500 |
| From main scanning stop 32 to deflection reference point | d8 (mm) | 39.500 |
| From deflection reference point to incident surface of first imaging optical element 71 | d9 (mm) | 20.000 |
| First imaging optical element 71, thickness | d10 (mm) | 5.000 |
| First imaging optical element 71, refractive index | n4 | 1.528 |
| From exit surface of first imaging optical element 71 to incident surface of second imaging optical element 72 | d11 (mm) | 79.100 |
| Second imaging optical element 72, thickness | d12 (mm) | 4.500 |
| Second imaging optical element 72, refractive index | n5 | 1.528 |
| From deflection reference point to scanned surface 9 | (mm) | 240.000 |
| Incident optical system 75, incident angle in main scanning direction | α (degree) | 90.000 |
| Incident optical system 75, incident angle in sub-scanning direction | β (degree) | ±3 |
| fθ coefficient | K (mm/rad) | 210.000 |
| Effective scanning angle | θ (degree) | ±30 |
| Effective scanning width | W (mm) | ±110 |
| Deflector 6, number of surfaces | Surface | 4 |
| Deflector 6, circumradius | Rpol (mm) | 10 |
| Deflector 6, center position | PX (mm) | −5.5 |
| Deflector 6, center position | PY (mm) | −4.5 |
| Sub-stop diameter | Width (mm) | 0.6 |
| Main stop diameter | Width (mm) | 4.0 |
| Second imaging optical element 72, Z shift | Z (mm) | 5.0 |

Lens surface data of imaging optical system 85

| | | First imaging optical element 71 | | | | Second imaging optical element 72b | | Second imaging optical element 72a | |
|---|---|---|---|---|---|---|---|---|---|
| | | 711b | 712b | 711a | 712a | Incident surface | Exit surface | Incident surface | Exit surface |
| Merid- ional line | R | −38.792 | −29.471 | −38.792 | −29.471 | −1,848.146 | 1,487.475 | −1,848.146 | 1,487.475 |
| | ky | −0.552 | −1.312 | −0.552 | −1.312 | 0.000 | −2,877.641 | 0.000 | −2,877.641 |
| | B1 | 0.000E+00 | 0.000E+00 | 0.000 | 0.000 | 0.000E+00 | 0.000E+00 | 0.000E+00 | 0.000E+00 |
| | B2 | 0.000E+00 | 0.000E+00 | 0.000 | 0.000 | 0.000E+00 | 0.000E+00 | 0.000E+00 | 0.000E+00 |
| | B3 | 0.000E+00 | 0.000E+00 | 0.000 | 0.000 | 0.000E+00 | 0.000E+00 | 0.000E+00 | 0.000E+00 |
| | B4 | 6.358E−06 | 8.020E−09 | 0.000 | 0.000 | 0.000E+00 | −2.440E−07 | 0.000E+00 | 2.440E−07 |
| | B5 | 0.000E+00 | 0.000E+00 | 0.000 | 0.000 | 0.000E+00 | 0.000E+00 | 0.000E+00 | 0.000E+00 |
| | B6 | −1.218E−08 | −3.955E−09 | 0.000 | 0.000 | 0.000E+00 | 2.272E−11 | 0.000E+00 | 2.272E−11 |
| | B7 | 0.000E+00 | 0.000E+00 | 0.000 | 0.000 | 0.000E+00 | 0.000E+00 | 0.000E+00 | 0.000E+00 |
| | B8 | 1.345E−11 | −1.420E−12 | 0.000 | 0.000 | 0.000E+00 | −1.674E−15 | 0.000E+00 | −1.674E−15 |
| | B9 | 0.000E+00 | 0.000E+00 | 0.000 | 0.000 | 0.000E+00 | 0.000E+00 | 0.000E+00 | 0.000E+00 |
| | B10 | 0.000E+00 | 4.840E−15 | 0.000 | 0.000 | 0.000E+00 | 5.532E−20 | 0.000E+00 | 5.532E−20 |
| | B11 | 0.000E+00 | 0.000E+00 | 0.000 | 0.000 | 0.000E+00 | 0.000E+00 | 0.000E+00 | 0.000E+00 |
| | B12 | 0.000E+00 | 0.000E+00 | 0.000 | 0.000 | 0.000E+00 | 0.000E+00 | 0.000E+00 | 0.000E+00 |
| Sagittal line | r | 20.000 | 20.000 | 20.000 | 20.000 | 50.382 | −75.958 | 50.382 | −75.958 |
| | E1 | 0.000E+00 | 0.000E+00 | 0.000 | 0.000 | 0.000E+00 | 0.000E+00 | 0.000E+00 | 0.000E+00 |
| | E2 | 0.000E+00 | −4.004E−04 | 0.000 | 0.000 | 0.000E+00 | 1.510E−04 | 0.000E+00 | 1.510E−04 |
| | E3 | 0.000E+00 | 0.000E+00 | 0.000 | 0.000 | 0.000E+00 | 0.000E+00 | 0.000E+00 | 0.000E+00 |

TABLE 6-continued

| | | | | | | | | |
|---|---|---|---|---|---|---|---|---|
| E4 | 0.000E+00 | 7.394E−07 | 0.000 | 0.000 | 0.000E+00 | 2.517E−09 | 0.000E+00 | 2.517E−09 |
| E5 | 0.000E+00 | 0.000E+00 | 0.000 | 0.000 | 0.000E+00 | 0.000E+00 | 0.000E+00 | 0.000E+00 |
| E6 | 0.000E+00 | 1.875E−09 | 0.000 | 0.000 | 0.000E+00 | 1.874E−12 | 0.000E+00 | 1.874E−12 |
| E7 | 0.000E+00 | 0.000E+00 | 0.000 | 0.000 | 0.000E+00 | 0.000E+00 | 0.000E+00 | 0.000E+00 |
| E8 | 0.000E+00 | 0.000E+00 | 0.000 | 0.000 | 0.000E+00 | −3.917E−16 | 0.000E+00 | 3.917E−16 |
| E9 | 0.000E+00 | 0.000E+00 | 0.000 | 0.000 | 0.000E+00 | 0.000E+00 | 0.000E+00 | 0.000E+00 |
| E10 | 0.000E+00 | 0.000E+00 | 0.000 | 0.000 | 0.000E+00 | 3.122E−20 | 0.000E+00 | 3.122E−20 |
| E11 | 0.000E+00 | 0.000E+00 | 0.000 | 0.000 | 0.000E+00 | 0.000E+00 | 0.000E+00 | 0.000E+00 |
| E12 | 0.000E+00 | 0.000E+00 | 0.000 | 0.000 | 0.000E+00 | 0.000E+00 | 0.000E+00 | 0.000E+00 |
| m0_1 | −2.194E−05 | −2.051E−05 | 2.194E−05 | 2.051E−05 | 1.046E−01 | 4.000E−02 | −1.046E−01 | −4.000E−02 |
| m1_1 | 0.000E+00 | 0.000E+00 | 0.000E+00 | 0.000E+00 | 1.412E−05 | 1.858E−05 | 1.412E−05 | 1.858E−05 |
| m2_1 | −9.715E−05 | 1.118E−04 | 9.715E−05 | 1.118E−04 | −9.546E−05 | −8.590E−05 | 9.546E−05 | 8.590E−05 |
| m3_1 | 0.000E+00 | 0.000E+00 | 0.000E+00 | 0.000E+00 | 5.713E−08 | 5.066E−08 | 5.713E−08 | −5.066E−08 |
| m4_1 | 7.973E−07 | 4.221E−07 | −7.973E−07 | −4.221E−07 | 2.243E−08 | 2.136E−08 | −2.243E−08 | −2.136E−08 |
| m5_1 | 0.000E+00 | 0.000E+00 | 0.000E+00 | 0.000E+00 | −2.991E−11 | −2.391E−11 | 2.991E−11 | 2.391E−11 |
| m6_1 | 4.200E−10 | 1.112E−09 | −4.200E−10 | −1.112E−09 | −2.296E−12 | −3.837E−12 | 2.296E−12 | 3.837E−12 |
| m7_1 | 0.000E+00 | 0.000E+00 | 0.000E+00 | 0.000E+00 | 6.926E−15 | 4.662E−15 | −6.926E−15 | −4.662E−15 |
| m8_1 | 0.000E+00 | 0.000E+00 | 0.000E+00 | 0.000E+00 | −7.773E−16 | 1.809E−16 | 7.773E−16 | −1.809E−16 |
| m9_1 | 0.000E+00 | 0.000E+00 | 0.000E+00 | 0.000E+00 | −7.033E−19 | −2.201E−19 | 7.033E−19 | 2.201E−19 |
| m10_1 | 0.000E+00 | 0.000E+00 | 0.000E+00 | 0.000E+00 | 1.290E−19 | 8.824E−20 | −1.290E−19 | 8.824E−20 |

In the light scanning apparatus 400 according to the fourth embodiment, a diffraction surface is formed in the exit surface of each of the cylindrical lenses 4a and 4b, and thus variations in spot diameter due to environmental variations are suppressed.

Further, a phase coefficient of the diffraction surface formed in the exit surface of each of the cylindrical lenses 4a and 4b is represented by the above-mentioned expression (5).

Further, the aspherical shapes of the incident surfaces and the exit surfaces of the first imaging optical element 71 and the second imaging optical elements 72a and 72b are represented by the above-mentioned expressions (1) to (3) similarly to the light scanning apparatus 100 according to the first embodiment.

Further, in the light scanning apparatus 400 according to the fourth embodiment, similarly to the light scanning apparatus 300 according to the third embodiment, in order to reduce the main scanning jitter amount ΔY, the sub-scanning stops 31a and 31b are arranged so as to satisfy the above-mentioned expression (6).

In the light scanning apparatus 400 according to the fourth embodiment, βs=3.1, Ls=9.9, and Tc=240 are obtained, and thus it is understood that the expression (6) is satisfied.

In this manner, a separation amount in the sub-scanning direction of the light fluxes at the time when the light fluxes enter the incident surfaces and the exit surfaces of the first imaging optical element 71 and the second imaging optical elements 72a and 72b can be reduced.

Further, as shown in Table 6, in the light scanning apparatus 400 according to the fourth embodiment, the first incident surface 711b, the first exit surface 712b, the second incident surface 711a, and the second exit surface 712a of the first imaging optical element 71 each have a first-order aspherical surface with respect to z.

That is, each optical surface is a sagittal tilt changing surface in which the sagittal tilt angle changes in accordance with the position y in the main scanning direction. In other words, in the first incident surface 711b, the first exit surface 712b, the second incident surface 711a, and the second exit surface 712a of the first imaging optical element 71, at least one of values of $M_{mn}$ is not equal to 0 provided that m is not equal to 0.

Similarly, the incident surface and the exit surface of the second imaging optical element 72a and the incident surface and the exit surface of the second imaging optical element 72b each have a first-order aspherical surface with respect to z.

That is, each optical surface is a sagittal tilt changing surface in which the sagittal tilt angle changes in accordance with the position y in the main scanning direction.

In other words, in the incident surface and the exit surface of the second imaging optical element 72a and the incident surface and the exit surface of the second imaging optical element 72b, at least one of values of $M_{mn}$ is not equal to 0 provided that m is not equal to 0.

Further, as shown in Table 6, in the light scanning apparatus 400 according to the fourth embodiment, in the first incident surface 711b, the first exit surface 712b, the second incident surface 711a, and the second exit surface 712a of the first imaging optical element 71, $M_{01}$ is not equal to 0.

That is, the first incident surface 711b, the first exit surface 712b, the second incident surface 711a, and the second exit surface 712a of the first imaging optical element 71 have sagittal tilt angles even on the optical axis.

Accordingly, in the first incident surface 711b, the first exit surface 712b, the second incident surface 711a, and the second exit surface 712a of the first imaging optical element 71, the origin in the shape definition and the surface vertex (most protruding point in the optical axis direction) do not match each other.

Similarly, in the incident surface and the exit surface of the second imaging optical element 72a and the incident surface and the exit surface of the second imaging optical element 72b, $M_{01}$ is not equal to 0.

That is, the incident surface and the exit surface of the second imaging optical element 72a and the incident surface and the exit surface of the second imaging optical element 72b have sagittal tilt angles even on the optical axis.

Accordingly, in the incident surface and the exit surface of the second imaging optical element 72a and the incident surface and the exit surface of the second imaging optical element 72b, the origin in the shape definition and the surface vertex (most protruding point in the optical axis direction) do not match each other.

Figure 18A:
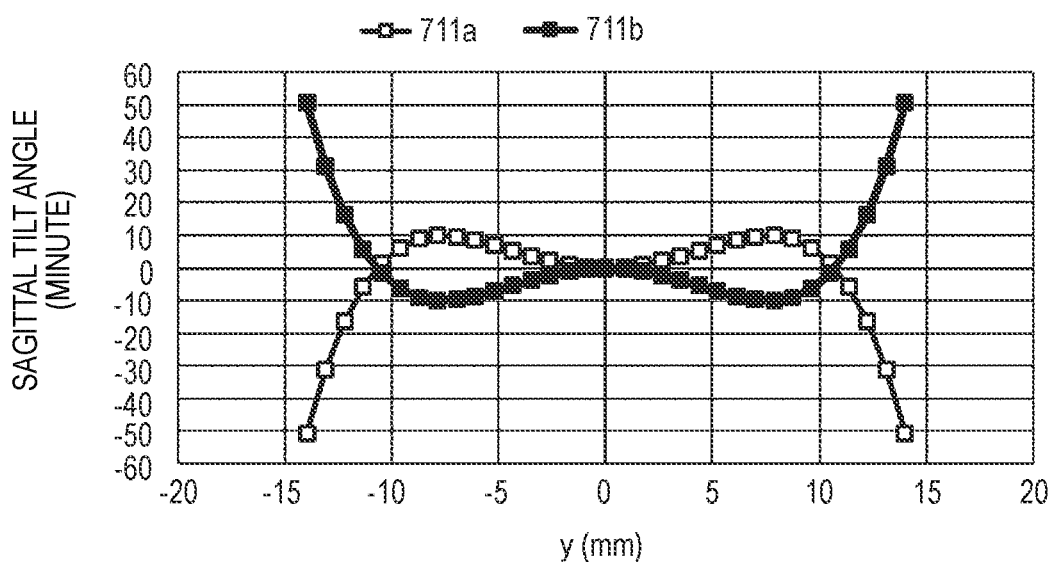
FIG. 18A is a graph for showing a main scanning direction position dependence of a sagittal tilt angle of each of optical surfaces of the imaging optical element in the light scanning apparatus according to the fourth embodiment.

FIG. 18A is a graph for showing a main scanning direction position dependence of a sagittal tilt angle of each of the first incident surface 711b and the second incident surface 711a of the first imaging optical element 71 in the light scanning apparatus 400 according to the fourth embodiment.

Figure 18B:
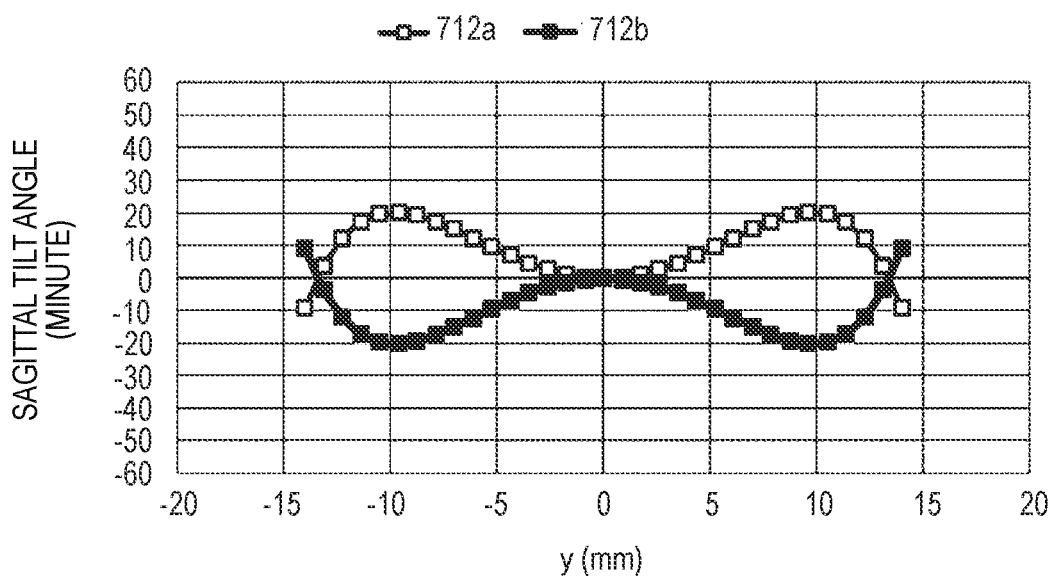
FIG. 18B is a graph for showing a main scanning direction position dependence of a sagittal tilt angle of each of optical surfaces of the imaging optical element in the light scanning apparatus according to the fourth embodiment.

Further, FIG. 18B is a graph for showing a main scanning direction position dependence of a sagittal tilt angle of each of the first exit surface 712b and the second exit surface 712a of the first imaging optical element 71 in the light scanning apparatus 400 according to the fourth embodiment.

As shown in FIG. 18A, the first incident surface 711b and the second incident surface 711a of the first imaging optical element 71 have different shapes.

Further, as shown in FIG. 18B, the first exit surface 712b and the second exit surface 712a of the first imaging optical element 71 have different shapes.

In this case, the sagittal tilt angle of the first incident surface 711b of the first imaging optical element 71 is represented by $T_{i1}$, and the sagittal tilt angle of the second incident surface 711a of the first imaging optical element 71 is represented by $T_{i2}$.

At this time, the light scanning apparatus 400 according to the fourth embodiment satisfies the following expression (7) at each position y in the main scanning direction.

$$T_{i1} \times T_{i2} \leq 0 \qquad (7)$$

When the light scanning apparatus 400 according to the fourth embodiment satisfies the expression (7), the separation amount in the sub-scanning direction of the light flux Rb with respect to the folding mirror 81a at the position of the folding mirror 81a can be sufficiently ensured so as to prevent the light flux Rb from entering the folding mirror 81a.

In this manner, in the light scanning apparatus 400 according to the fourth embodiment, interference accompanying with the arrangement of the optical elements can be suppressed.

Further, in the light scanning apparatus 400 according to the fourth embodiment, angles $\gamma_a$ and $\gamma_b$ satisfy the following expression (8). The angles $\gamma_a$ and $\gamma_b$ are formed by an arrangement direction of the light emitting points LD1a to LD4a of the light source 1a and an arrangement direction of the light emitting points LD1b to LD4b of the light source 1b, respectively, with respect to the main scanning direction within a cross section perpendicular to the optical axis.

$$\frac{\gamma_a}{\gamma_b} < 0 \qquad (8)$$

When the light scanning apparatus 400 according to the fourth embodiment satisfies the expression (8), a difference between the main scanning jitter amounts ΔY caused in the respective scanned surfaces 9a and 9b can be reduced.

Figure 19:
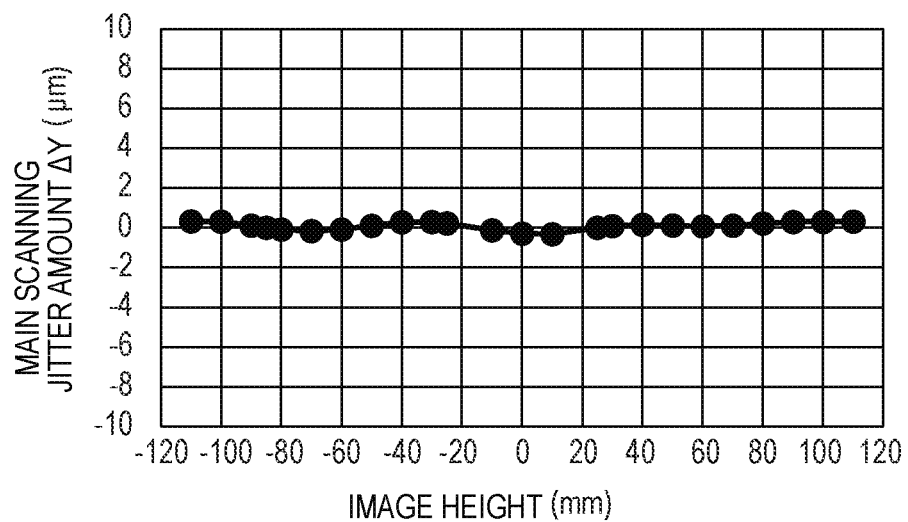
FIG. 19 is a graph for showing an image height dependence of a main scanning jitter amount in the light scanning apparatus according to the fourth embodiment.

FIG. 19 is a graph for showing an image height dependence of the main scanning jitter amount ΔY in the light scanning apparatus 400 according to the fourth embodiment.

As shown in FIG. 19, it is understood that, also in the light scanning apparatus 400 according to the fourth embodiment, the main scanning jitter amount ΔY to be caused by the difference of the incident positions of the light fluxes in the sub-scanning direction on the first imaging optical element 71 and the second imaging optical element 72 can be reduced.

As described above, when the above-mentioned configuration is adopted in the light scanning apparatus 400 according to the fourth embodiment, the main scanning jitter is reduced, and thus the image quality can be increased.

Further, the interference accompanying with the arrangement of the optical elements is suppressed, and hence the apparatus can be formed compact.

As described above, according to the light scanning apparatus 400 of the fourth embodiment, even when the obliquely-incident system is used, reduction of ghost and return light and correction of the optical performance including the main scanning jitter can be both achieved, and thus a satisfactory image can be easily formed when the light scanning apparatus 400 is used in the image forming apparatus.

According to an aspect of the embodiments, it is possible to provide a light scanning apparatus with which sufficient optical performance can be ensured while occurrence of unnecessary light is suppressed.

[Image Forming Apparatus]

Figure 20:
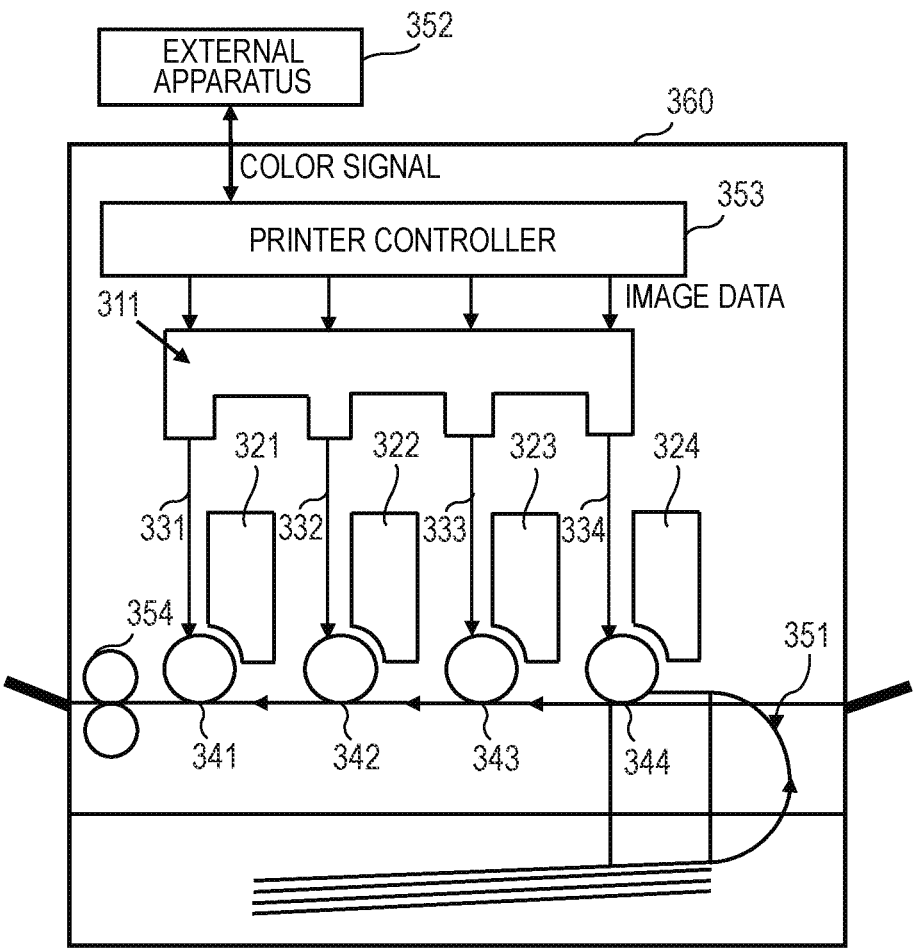
FIG. 20 is a sub-scanning cross-sectional view of a main part of a color image forming apparatus according to an embodiment.

FIG. 20 is a schematic cross-sectional view of a main part of a color image forming apparatus 360 including a light scanning apparatus 311 according to the first embodiment.

The color image forming apparatus 360 is a tandem-type color image forming apparatus in which the light scanning apparatus 311 is used to record image information on a surface of a photosensitive drum serving as an image bearing member.

The color image forming apparatus 360 includes the light scanning apparatus 311 according to the first embodiment, photosensitive drums 341, 342, 343, and 344 each serving as the image bearing member, developing units 321, 322, 323, and 324, a conveyance belt 351, a printer controller 353, and a fixing unit 354.

To the color image forming apparatus 360, color signals of red (R), green (G) and blue (B) output from an external apparatus 352, for example, a personal computer, are input.

Those color signals are converted into image data (dot data) of cyan (C), magenta (M), yellow (Y), and black (K) by the printer controller 353 in the apparatus.

Then, the acquired pieces of image data are input to the light scanning apparatus 311, and light beams 331, 332, 333, and 334 modulated in accordance with the respective pieces of image data are emitted from the light scanning apparatus 311.

Then, those light beams scan, in the main scanning direction, the photosensitive surfaces of the respective photosensitive drums 341, 342, 343, and 344.

Then, with the light beams 331, 332, 333, and 334 emitted by the light scanning apparatus 311 based on the respective pieces of image data, latent images of respective colors are formed on the photosensitive surfaces of the corresponding photosensitive drums 341, 342, 343, and 344.

After that, the latent images of the respective colors are developed by the developing units 321, 322, 323, and 324 into toner images of the respective colors.

Then, the developed toner images of the respective colors are transferred on a recording material (transferred material) conveyed by the conveyance belt 351 in superimposition by a transferring unit (not shown), and the transferred toner images are fixed by the fixing unit 354. Thus, one full-color image is formed.

The color image forming apparatus 360 according to this embodiment is configured to record, by the light scanning apparatus 311, image signals (image information) in parallel onto the photosensitive surfaces of the photosensitive drums 341, 342, 343, and 344 corresponding to the respective colors of C, M, Y, and K, to thereby print color images at high speed.

That is, in the color image forming apparatus 360 according to this embodiment, as described above, the light scanning apparatus 311 is configured to form the latent images of the respective colors on the corresponding photosensitive drum surfaces through use of the light beams that are based on the respective pieces of image data. After that, the images are transferred in superimposition onto the recording material to form one full-color image.

In the color image forming apparatus 360 according to this embodiment, in place of the light scanning apparatus 311 according to the first embodiment, the light scanning apparatus according to the second embodiment may be used. Alternatively, four light scanning apparatus according to the third embodiment or two light scanning apparatus according to the fourth embodiment may be used.

Further, as the external apparatus 352, for example, a color image reading apparatus including a CCD sensor may be used. In this case, this color image reading apparatus and the color image forming apparatus 360 form a color digital copying machine.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No., 2020-066473 filed Apr. 2, 2020, and Japanese Patent Application No. 2021-049648 filed Mar. 24, 2021, which are hereby incorporated by reference herein in their entirety.

What is claimed is:

1. An apparatus comprising:
a first deflector configured to deflect a first light flux from a first light source to scan a first surface in a main scanning direction;
a first imaging optical system which includes a first optical element and a second optical element, and is configured to guide the deflected first light flux to the first surface; and
a first incident optical system which includes a sub-scanning stop configured to restrict a light flux diameter in the sub-scanning direction of a first plurality of light fluxes from the first light source including a plurality of light emitting points, and is configured to cause the first plurality of light fluxes to enter a first deflecting surface of the first deflector;
wherein, regarding an incident surface and an exit surface of each of the first optical element and the second optical element, when an intersection with an optical axis is set as an origin, an axis parallel to the optical axis is set as an x-axis, an axis perpendicular to the optical axis within a main scanning cross section is set as a y-axis, an axis perpendicular to the optical axis within a sub-scanning cross section is set as a z-axis, an aspherical coefficient is represented by $M_{mn}$, a curvature radius within the sub-scanning cross section including the optical axis is represented by r, a variation coefficient is represented by $E_i$, and shapes within the sub-scanning cross section of the incident surface and the exit surface of each of the first optical element and the second optical element are represented by the following equations:

$$x = \frac{z^2/r'}{1 + (1-(z/r')^2)^{1/2}} + \sum_{n=1}^{8}\sum_{m=0}^{16} M_{mn} y^m z^n$$

-continued
$$r' = r\left(1 + \sum_{i=1}^{16} E_i y^i\right)$$

in each of the incident surface and the exit surface of the first optical element and each of the incident surface and the exit surface of the second optical element, at least one of values of $M_{mn}$ is not equal to 0 provided that m is not equal to 0,
wherein the incident surface and the exit surface of the second optical element have $M_{01}$ of the same sign, and
wherein the following inequality is satisfied:

$Ls \leq Tc/(\beta s)^2$, where $\beta s$ represents a lateral magnification of the first incident optical system within the sub-scanning cross section, Ls represents a distance on the optical axis from the first light source to the sub-scanning stop, and Tc represents a distance from an axial deflecting point of the first deflector to the first surface.

2. The apparatus according to claim 1, wherein, when values obtained by the following expression:

$$\sum_{m=0}^{16} M_{m1} y^m$$

for at least one of the incident surface or the exit surface of the first optical element and the incident surface of the second optical element are represented by $T_1$ and $T_2$, respectively, the following condition is satisfied at each coordinate on the y-axis: $T_1 \times T_2 \geq 0$.

3. The apparatus according to claim 1, wherein, in at least one of the incident surface or the exit surface of the first optical element, $M_{01}$ is equal to 0.

4. The apparatus according to claim 1, further comprising a transmitting member configured to transmit the first light flux,
wherein a normal to an optical surface of the transmitting member on the optical axis within the sub-scanning cross section is inclined in the same direction as a normal to the incident surface and the exit surface of the second optical element on the optical axis within the sub-scanning cross section.

5. The apparatus according to claim 1, further comprising an incident optical system configured to cause the first light flux to perpendicularly enter a first deflecting surface of the first deflector within the sub-scanning cross section.

6. The apparatus according to claim 1, further comprising:
an incident optical system configured to cause a second light flux from a second light source to perpendicularly enter a second deflecting surface of the first deflector within the sub-scanning cross section; and
a second imaging optical system configured to guide the deflected second light flux deflected by the second deflecting surface to a second surface,
wherein the first deflector is configured to deflect the second light flux to scan the second surface in the main scanning direction.

7. The apparatus according to claim 1, further comprising:
a second deflector configured to deflect a third light flux from a third light source and a fourth light flux from a fourth light source to scan a third surface and a fourth surface in the main scanning direction;
a third incident optical system and a fourth incident optical system which are configured to cause the third light flux and the fourth light flux to perpendicularly enter a first deflecting surface and a second deflecting surface of the second deflector, respectively, within the sub-scanning cross section; and a third imaging optical system and a fourth imaging optical system which are configured to guide the third light flux deflected by the first deflecting surface of the second deflector and the fourth light flux deflected by the second deflecting surface of the second deflector to the third surface and the fourth surface, respectively.

8. The apparatus according to claim 1, wherein the first optical element includes an optical surface having a largest positive refractive power within the main scanning cross section among optical surfaces of the first imaging optical system.

9. The apparatus according to claim 1, wherein the first incident optical system is configured to cause the first plurality of light fluxes to obliquely enter the first deflector within the sub-scanning cross section.

10. The apparatus according to claim 9, further comprising:

a second incident optical system configured to cause a second plurality of light fluxes from a second light source including a plurality of light emitting points to obliquely enter the first deflecting surface of the first deflector; and a second imaging optical system configured to guide the second plurality of light fluxes and deflected by the first deflecting surface to a second surface, wherein the first deflector is configured to deflect the second plurality of light fluxes to scan the second surface in the main scanning direction.

11. The apparatus according to claim 10, wherein the second imaging optical system includes the first optical element.

12. The apparatus according to claim 11, wherein the first plurality of light fluxes enters a first incident surface of the first optical element, and then exit from a first exit surface of the first optical element, wherein the second plurality of light fluxes enter a second incident surface of the first optical element, and then exit from a second exit surface of the first optical element, and wherein, when values obtained by the following expression:

$$\sum_{m=0}^{16} M_{m1} y^m$$

for each of the first incident surface and the second incident surface are represented by $T_{i1}$ and $T_{i2}$, respectively, the following inequality is satisfied at each coordinate on the y-axis:

$$T_{i1} \times T_{i2} \leq 0.$$

13. The apparatus according to claim 10, wherein the following condition is satisfied:

$$\gamma_a / \gamma_b < 0,$$

where $\gamma_a$ represents an angle formed by an arrangement direction of the plurality of light emitting points of the first light source with respect to the main scanning direction within a cross section perpendicular to the optical axis, and $\gamma_b$ represents an angle formed by an arrangement direction of the plurality of light emitting points of the second light source with respect to the main scanning direction within the cross section perpendicular to the optical axis.

14. An image forming apparatus comprising:
the apparatus of claim 1;
a developing unit configured to develop, as a toner image, an electrostatic latent image formed on the first surface by the apparatus;
a transferring unit configured to transfer the developed toner image onto a transferred material; and
a fixing unit configured to fix the transferred toner image on the transferred material.

15. An image forming apparatus comprising:
the apparatus of claim 1; and
a printer controller configured to convert a signal output from an external apparatus into image data to input the image data to the apparatus.

16. The image forming apparatus according to claim 14, wherein, when values obtained by the following expression:

$$\sum_{m=0}^{16} M_{m1} y^m$$

for at least one of the incident surface or the exit surface of the first optical element and the incident surface of the second optical element are represented by $T_1$ and $T_2$, respectively, the following condition is satisfied at each coordinate on the y-axis: $T_1 \times T_2 \geq 0$.

17. The image forming apparatus according to claim 15, wherein, when values obtained by the following expression:

$$\sum_{m=0}^{16} M_{m1} y^m$$

for at least one of the incident surface or the exit surface of the first optical element and the incident surface of the second optical element are represented by $T_1$ and $T_2$, respectively, the following condition is satisfied at each coordinate on the y-axis: $T_1 \times T_2 \geq 0$.

* * * * *